US012655299B2

(12) United States Patent
Gerard et al.

(10) Patent No.: US 12,655,299 B2
(45) Date of Patent: Jun. 16, 2026

(54) PROCESS FOR PRODUCING A WHITE UV-ABSORBING SURFACE-REACTED CALCIUM CARBONATE DOPED WITH A TITANIUM SPECIES, A WHITE UV-ABSORBING SURFACE-REACTED CALCIUM CARBONATE AND USE THEREOF

(71) Applicant: Omya International AG, Oftringen (CH)

(72) Inventors: Daniel Edward Gerard, Basel (CH); Jamal Ftouni, Zofingen (CH)

(73) Assignee: Omya International AG, Oftringen (CH)

( * ) Notice: Subject to any disclaimer, the term of this patent is extended or adjusted under 35 U.S.C. 154(b) by 84 days.

(21) Appl. No.: 18/868,021

(22) PCT Filed: May 23, 2023

(86) PCT No.: PCT/EP2023/063786
§ 371 (c)(1),
(2) Date: Nov. 21, 2024

(87) PCT Pub. No.: WO2023/227600
PCT Pub. Date: Nov. 30, 2023

(65) Prior Publication Data
US 2025/0179301 A1       Jun. 5, 2025

(30) Foreign Application Priority Data
May 25, 2022    (EP) ...................................... 22175483

(51) Int. Cl.
| | |
|---|---|
| *C09C 1/36* | (2006.01) |
| *C09C 3/00* | (2006.01) |
| *C09C 3/04* | (2006.01) |
| *C09C 3/06* | (2006.01) |

(52) U.S. Cl.
CPC .......... *C09C 1/3692* (2013.01); *C09C 1/3623* (2013.01); *C09C 1/363* (2013.01); *C09C 1/3661* (2013.01); *C09C 3/006* (2013.01); *C09C 3/041* (2013.01); *C09C 3/043* (2013.01); *C09C 3/063* (2013.01); *C01P 2004/80* (2013.01)

(58) Field of Classification Search
CPC ..... C09C 1/363; C09C 1/3623; C09C 1/3661; C09C 1/3692; C09C 3/006; C09C 3/041; C09C 3/043; C09C 3/063; C01P 2004/80
See application file for complete search history.

(56) References Cited

U.S. PATENT DOCUMENTS

| | | | |
|---|---|---|---|
| 7,476,704 | B2 | 1/2009 | Agra-Gutierrez et al. |
| 2019/0380927 | A1* | 12/2019 | Budde ...................... A61K 8/29 |
| 2020/0397672 | A1* | 12/2020 | Budde .................... A61Q 19/00 |
| 2021/0077368 | A1* | 3/2021 | Budde ...................... A61Q 1/10 |
| 2022/0089879 | A1* | 3/2022 | Gerard .................. C01B 25/327 |

FOREIGN PATENT DOCUMENTS

| | | |
|---|---|---|
| AU | 630406 B2 | 10/1992 |
| EP | 0634462 A2 | 1/1995 |
| EP | 1712523 A1 | 10/2006 |
| EP | 1712597 A1 | 10/2006 |
| EP | 2371766 A1 | 10/2011 |
| EP | 2447213 A1 | 5/2012 |
| EP | 2524898 A1 | 11/2012 |
| EP | 2926797 A1 | 10/2015 |
| EP | 2997833 A1 | 3/2016 |
| EP | 3360601 A1 | 8/2018 |
| EP | 3517176 A1 | 7/2019 |
| EP | 3517178 A1 | 7/2019 |
| EP | 2188125 B1 | 8/2019 |
| EP | 3693339 A1 | 8/2020 |
| WO | 2004083316 A1 | 9/2004 |
| WO | 2013142473 A1 | 9/2013 |
| WO | 2022013332 A1 | 1/2022 |

OTHER PUBLICATIONS

International Search Report and Written Opinion issued in PCT/EP2023/063786 mailed Aug. 2, 2023.
Gane, P.A.C., Kettle, J.P., Matthews, G.P. and Ridgway, C.J.; "Void Space Structure of Compressible Polymer Spheres and Consolidated Calcium Carbonate Paper-Coating Formulations"; Industrial and Engineering Chemistry Research 1996; 35(5):1753-1764.

* cited by examiner

*Primary Examiner* — Bijan Ahvazi
(74) *Attorney, Agent, or Firm* — Heslin Rothenberg Farley & Mesiti P.C.

(57)       ABSTRACT

The present invention refers to a process for producing white UV-absorbing surface-reacted calcium carbonate doped with a titanium species, comprising the steps of providing a calcium carbonate-comprising material, a calcium phosphate selected from monocalcium phosphate and/or dicalcium phosphate, and at least one titanium comprising substance, treating the calcium carbonate-comprising material with the calcium phosphate in an aqueous medium to form an aqueous suspension and grinding the aqueous suspension at a pH value of at least 4.2 to form an aqueous suspension of surface-reacted calcium carbonate, wherein the calcium carbonate-comprising material and the calcium phosphate in combination have a calcium ion to phosphate ion molar ratio $(Ca^{2+}:PO_4^{3-})$ in the range from 1.75:1 to 100:1, and wherein the at least one titanium comprising substance is added before and/or during and/or after the treatment step and/or before and/or during the grinding step.

18 Claims, No Drawings

PROCESS FOR PRODUCING A WHITE UV-ABSORBING SURFACE-REACTED CALCIUM CARBONATE DOPED WITH A TITANIUM SPECIES, A WHITE UV-ABSORBING SURFACE-REACTED CALCIUM CARBONATE AND USE THEREOF

CROSS REFERENCE TO RELATED APPLICATIONS

This application is a U.S. National Phase filing under 35 U.S.C. § 371 of International Application PCT/EP2023/063786, filed May 23, 2023. PCT/EP2023/063786 claims priority from European application number 22175483.1 filed May 25, 2022. The entire contents of each of these prior applications are hereby incorporated herein by reference.

The present invention refers to a process for producing white UV-absorbing surface-reacted calcium carbonate doped with a titanium species, comprising the steps of providing a calcium carbonate-comprising material, a calcium phosphate selected from monocalcium phosphate and/or dicalcium phosphate, and at least one titanium comprising substance and treating the calcium carbonate-comprising material with the calcium phosphate in an aqueous medium to form an aqueous suspension and grinding the aqueous suspension at a pH value of at least 4.2 to form an aqueous suspension of a white UV-absorbing surface-reacted calcium carbonate doped with a titanium species, wherein the calcium carbonate-comprising material and the calcium phosphate in combination have a calcium ion to phosphate ion molar ratio ($Ca^{2+}:PO_4^{3-}$) in the range from 1.75:1 to 100:1, and wherein the at least one titanium comprising substance is added before and/or during and/or after the treatment step and/or before and/or during the grinding step. Furthermore, the present invention refers to a white UV-absorbing surface-reacted calcium carbonate doped with a titanium species obtained by that process, the use of said white UV-absorbing surface-reacted calcium carbonate doped with a titanium species as well as an article comprising said white UV-absorbing surface-reacted calcium carbonate doped with a titanium species.

BACKGROUND

Mineral fillers and especially calcium carbonate-containing mineral fillers are often used as particulate fillers that are added to resin or binders, paints or papers and can improve specific properties such as, for example, opacity, brightness, stability, viscosity, strength or stiffness, and can make the product cheaper, or a mixture of both.

EP2997833 refers to the use of a surface-reacted calcium carbonate as anti-caking agent, wherein the surface-reacted calcium carbonate is a reaction product of natural ground or precipitated calcium carbonate with carbon dioxide and at least one acid in an aqueous medium, wherein the at least one acid is selected from the group consisting of hydrochloric acid, sulphuric acid, sulphurous acid, phosphoric acid, citric acid, oxalic acid, acetic acid, formic acid, and mixtures thereof, wherein the carbon dioxide is formed in situ by the acid treatment and/or is supplied from an external source and wherein the surface-reacted calcium carbonate particles have a volume median grain diameter $d_{50}$ of from 0.1 to 50 µm.

EP2926797 refers to an oral care composition for use in remineralisation and/or whitening of teeth, comprising a surface-reacted calcium carbonate, wherein the surface-reacted calcium carbonate is a reaction product of natural or synthetic calcium carbonate with carbon dioxide and at least one acid.

EP20186219.0 refers to a curable fluoropolymer composition comprising a crosslinkable fluorine-containing polymer, and surface-reacted calcium carbonate as filler.

EP3693339 refers to a process for producing an aqueous suspension of surface-reacted calcium salt particles by mixing a calcium salt excluding monocalcium phosphate and dicalcium phosphate, a calcium phosphate selected from monocalcium phosphate and/or dicalcium phosphate, with water, and grinding the obtained aqueous suspension at a pH value of at least 4.2 to form an aqueous suspension of surface-reacted calcium salt particles.

In addition thereto often further pigments and particles are added that add further advantageous features to the filler composition. Pigments or particles are generally known as materials that change the colour of reflected or transmitted light as the result of wavelength-selective absorption. This physical process differs from fluorescence, phosphorescence, and other forms of luminescence, in which a material emits light. Pigments are used for colouring e.g. paint, ink, plastic, fabric, cosmetics, food and other materials. Most pigments used are dry colourants, usually ground into a fine powder.

White pigments take a special position in the field of pigments due to their industrial relevance. For example, in the paper industry in Europe more than 10 million tonnes per year of white pigments are used. White pigments are also used in paints and coatings. Especially when manufacturing dispersion paints, white pigments are the base colour in the tinting system.

A known white pigment is titanium dioxide which is also called titanium white, Pigment White 6 (PW6), CI 77891, or E number E171. Generally, it is sourced from ilmenite, rutile, and anatase or a mixture. It has a wide range of applications, especially as white pigment in paper, and plastic materials but also in paint. Additionally, due to its white colour it is also used as food colouring or in cosmetic applications. Furthermore, titanium dioxide is able to absorb in the UV range and, therefore is often used in sunscreens and sunscreen applications.

EP0634462 refers to coating compositions containing very finely divided $TiO_2$, comprising from 0.5 to 30.0% by volume of colour pigment and/or carbon black, from 55.0 to 98.5% by volume of binder solids and from 0.3 to 15.0% by volume of very finely divided $TiO_2$ with a particle size of from 5 to 40 nm, and having a high overall reflectance (luminance) and an intense depth of colour.

EP2188125 refers to a self-cleaning, de-polluting paint comprising from about 5% to about 40% by volume photocatalytic titanium dioxide in substantially pure anatase form, said photocatalytic titanium dioxide being characterized by an average crystallite size between about 5 nm and about 30 nm and having photocatalytic activity in the presence of visible light; one or more additional pigments, and a styrene acrylic copolymer binder.

U.S. Pat. No. 7,476,704 refers to a polymer composition comprising a polymer resin, a flash calcined kaolin clay filler and a titanium dioxide filler. The titanium dioxide has a median aggregate size in the range of from about 0.2 to 0.35 µm.

AU630406 refers to titanium dioxide particles having a mean primary particle size of less than 100 nm, each of said particles being substantially coated with phospholipids. The phospholipid-coated titanium dioxide particles may be incorporated into oil-in-water and water-in-oil emulsions to provide novel sunscreen compositions with excellent ultraviolet screening efficiency, long term stability and water-resistant properties.

EP3360601 refers to a cosmetic composition having UV-A and/or UV-B protection comprising at least one inorganic UV filter, and a surface-reacted calcium carbonate having a volume median particle size $d_{50}$ from 0.1 to 90 μm, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ on donors treatment and/or is supplied from an external source. However, in this patent application only a mixture of an inorganic UV filter and a surface-reacted calcium carbonate is provided but the structure of the surface-reacted calcium carbonate is not amended.

EP3517176 refers to the use of a surface-reacted calcium carbonate having a volume median particle size $d_{50}$ from 0.1 to 90 μm as skin appearance modifier in a cosmetic and/or skin care composition, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source. EP3517178 refers to the use of a surface-reacted calcium carbonate in a cosmetic and/or skin care composition as an agent for modifying the biomechanical properties of the skin, wherein the surface-reacted calcium carbonate has a volume median particle size $d_{50}$ from 0.1 to 90 μm, and wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source. The cosmetic and/or skin care composition may comprise further additives such as inorganic UV filters, for example titanium dioxide. However, also these document refer only to mixtures of an inorganic UV filter and a surface-reacted calcium carbonate but the structure of the surface-reacted calcium carbonate is not amended.

However, in several applications the titanium dioxide is used in form of powders comprising submicrometer or nanometer size titanium dioxide particles. This is disadvantageous since $TiO_2$ powders in the submicron and/or nanometer size are a concern due to the potentially carcinogenic aspect of such small titanium dioxide particles. Due to this potential carcinogenicity there are attempts in the European Union to prohibit such particles at least in food and cosmetic applications.

Another drawback is that when both compounds, surface-reacted calcium carbonate and a titanium containing material (e.g. titanium dioxide), are mixed in form of dry products this may lead to dusting is created which may cause health issues, especially when inhaled.

In view of the foregoing, there is an ongoing need for processes to produce particles or fillers that comprise surface-reacted calcium carbonate as well as a titanium species and have excellent properties in view of their colour, their UV-absorbance as well as in view of their mechanical and particle properties.

Accordingly, it is an object of the present invention to provide a process for preparing an improved filler or improved particles that comprise surface-reacted calcium carbonate and can be used in polymer applications, paper coating applications, paper making, paints, coatings, sealants, adhesives, feed, pharmaceuticals, concrete, cement, cosmetics, water treatment, engineered wood applications, plasterboard applications, packaging applications, catalysis, gas treatment applications and/or agricultural applications. The filler or particles should have a white appearance so that they can especially be used in paint and paper and do not add an unwanted colour to such applications.

Furthermore, it is desirable to provide a process for preparing fillers or particles that have UV-absorbing properties and can be used in pharmaceuticals such as tablet coatings or implants or cosmetics especially in sunscreens and sunscreen applications. The fillers or particles as well as the process should be non-toxic to humans, do not provide a harmful effect on the environment and might be used in cosmetic applications.

Especially, the fillers or particles obtained by the process should be free of titanium dioxide in the submicron and/or nanometer size range in order to avoid health issues especially carcinogenicity of such products. Furthermore, the fillers and particles obtained by the process should have a defined crystal structure. Additionally, it is desirable that by the process the titanium species cannot be separated from the surface-reacted calcium carbonate by mere washing or in liquid compositions.

Another object of the present invention is that the process for producing the fillers or particles should be easily and quickly produced, are affordable and especially easy to handle. Furthermore, it is also an object of the present invention to provide a material, which is at least partially derivable from natural sources and is not persistent in the environment.

Additionally it is an object of the present invention to provide an economic process which can utilize starting materials having a lower quality such as by-products of other processes or waste-materials. It would also be desirable to provide a process which can utilize coarse starting materials. Furthermore, the process for producing the white UV-absorbing surface-reacted calcium carbonate particles should be able to be carried out as continuous process and should be able to be operated at low starting temperatures. It is desirable to provide a process, which can be carried out with standard equipment.

SUMMARY OF THE INVENTION

The foregoing and other objects are solved by the subject-matter as defined in the independent claims.

According to one aspect of the present invention a process for producing a white UV-absorbing surface-reacted calcium carbonate doped with titanium is provided comprising the steps of:

a) providing a calcium carbonate-comprising material,
b) providing a calcium phosphate selected from mono-calcium phosphate and/or dicalcium phosphate,
c) providing at least one titanium comprising substance, and
d) treating the calcium carbonate-comprising material of step a) with the calcium phosphate of step b) in an aqueous medium to form an aqueous suspension and
e) grinding the aqueous suspension of step d) at a pH value of at least 4.2 to form an aqueous suspension of a white UV-absorbing surface-reacted calcium carbonate doped with a titanium species, wherein the calcium carbonate-comprising material of step a) and the calcium phosphate of step b) in combination have a calcium ion to phosphate ion molar ratio ($Ca^{2+}:PO_4^{3-}$) in the range from 1.75:1 to 100:1, and wherein the at least one titanium comprising substance of step c) is added before and/or during and/or after step d) and/or before and/or during step e).

According to another aspect of the present invention a white UV-absorbing surface-reacted calcium carbonate doped with a titanium species obtainable according to the process of the present invention is provided.

The inventors surprisingly found out that by the inventive process it is possible to prepare surface-reacted calcium carbonate particles that are doped with a titanium species. The process for producing these particles is an easy and quick process and the obtained product is affordable and especially easy to handle. The process can be performed in standard equipment without significant burden for humans and environment. Furthermore, the inventors surprisingly found that by the process of the present invention it is possible to provide a material, which is at least partially derivable from natural sources and is not persistent in the environment. The inventors also surprisingly found that in the inventive process starting materials having a lower quality such as by-products of other processes or waste-materials can be used and especially coarse starting materials can be used.

Such a process and product is advantageous since the end consumer has not to handle particles that comprise titanium dioxide in form of powders comprising submicrometer or nanometer size titanium dioxide particles. Rather, the obtained particles comprise the advantageous properties of the surface-reacted calcium carbonate and especially have a high surface area and, furthermore, are of white colour and are UV-absorbing. Additionally, the particles obtained by the inventive process are advantageous since the titanium species cannot be separated from the surface-reacted calcium carbonate by mere washing or in liquid compositions.

The obtained white UV-absorbing surface-reacted calcium carbonate doped with a titanium species can be used in several applications such as, for example, paint, paper, coatings or sunscreens. Such products have not to be labelled in the ingredient list with titanium dioxide particles in the submicron and/or nanometer size range and, therefore, should have a higher acceptance from the end consumer. The filler or particles should have a white appearance so that they can especially be used in paint and paper and do not add an unwanted colour to such applications.

According to another aspect of the present invention the white UV-absorbing surface-reacted calcium carbonate doped with a titanium species obtainable by the process of the present invention is used in polymer applications, paper coating applications, paper making, paints, coatings, sealants, adhesives, feed, pharmaceuticals, concrete, cement, cosmetics, water treatment, engineered wood applications, plasterboard applications, packaging applications, catalysis, gas treatment applications and/or agricultural applications.

According to another aspect of the present invention the white UV-absorbing surface-reacted calcium carbonate doped with a titanium species obtainable by the process of the present invention is used for sun protection of plants and parts thereof or for chemical and physical sun protection in a cosmetic formulation.

According to another aspect of the present invention an article comprising a white UV-absorbing surface-reacted calcium carbonate doped with a titanium species obtainable by the process of the present invention is provided, wherein the article is selected from paper products, engineered wood products, plasterboard products, polymer products, hygiene products, medical products, healthcare products, filter products, woven materials, nonwoven materials, geotextile products, agriculture products, horticulture products, clothing, footwear products, baggage products, household products, industrial products, packaging products, building products, and construction products.

Advantageous embodiments of the above aspects are defined in the corresponding sub-claims.

According to one embodiment of the present invention, the calcium carbonate-comprising material is a natural ground calcium carbonate and/or a precipitated calcium carbonate, preferably the natural ground calcium carbonate is selected from the group consisting of marble, chalk, limestone, and mixtures thereof, and/or the precipitated calcium carbonate is selected from the group consisting of precipitated calcium carbonates having an aragonitic, vateritic or calcitic crystal form, and mixtures thereof.

According to another embodiment of the present invention, the calcium carbonate-comprising material is in form of particles having a weight median particle size $d_{50}$ (wt) from 0.05 to 500 µm, preferably from 0.2 to 200 µm, more preferably from 0.4 to 100 µm, and most preferably from 0.6 to 20 µm, and/or a weight top cut particle size $d_{98}$ (wt) from 0.15 to 1500 µm, preferably from 1 to 600 µm, more preferably from 1.5 to 300 µm, and most preferably from 2 to 80 µm.

According to another embodiment of the present invention, the calcium carbonate-comprising material of step a) and the calcium phosphate of step b) in combination have a calcium ion to phosphate ion molar ratio ($Ca^{2+}:PO_4^{3-}$) in the range from 1.9:1 to 75:1, preferably from 2:1 to 50:1, more preferably from 2.2:1 to 25:1, and most preferably from 2.5:1 to 10:1.

According to another embodiment of the present invention, the calcium phosphate of step b) is dicalcium phosphate dihydrate and is provided in an amount from 1.7 to 230 wt.-%, based on the total weight of the calcium carbonate-comprising material of step a), preferably from 2.3 to 191 wt.-%, more preferably from 3.5 to 172 wt.-%, and most preferably from 19 to 115 wt.-%, or wherein the calcium phosphate of step b) is anhydrous dicalcium phosphate and is provided in an amount from 1.4 to 181 wt.-%, based on the total weight of the calcium carbonate-comprising material of step a), preferably from 1.8 to 151 wt.-%, more preferably from 2.8 to 136 wt.-%, and most preferably from 15 to 91 wt.-%, or wherein the calcium phosphate of step b) is anhydrous monocalcium phosphate and is provided in an amount from 1.2 to 94 wt.-%, based on the total weight of the calcium carbonate-comprising material of step a), preferably from 1.6 to 84 wt.-%, more preferably from 2.4 to 78 wt.-%, and most preferably from 12 to 59 wt.-%, or wherein the calcium phosphate of step b) is monocalcium phosphate monohydrate and is provided in an amount from 1.3 to 100 wt.-%, based on the total weight of the calcium carbonate-comprising material of step a), preferably from 1.7 to 90 wt.-%, more preferably from 2.5 to 84 wt.-%, and most preferably from 13 to 63 wt.-%.

According to another embodiment of the present invention, the at least one titanium comprising substance is selected from the group consisting of a titanium salt, a titanium hydroxide, a titanium dioxide, and mixtures thereof, preferably the titanium comprising substance is selected from the group consisting of titanium bromide, titanium fluoride, titanium iodide, titanium chloride, titanyl sulfate, titanium hydroxide, titanium dioxide, and mixtures thereof and most preferably the titanium comprising substance is selected from titanium bromide, titanium fluoride, titanium iodide, titanium chloride, titanyl sulfate and mixtures thereof.

According to another embodiment of the present invention, the at least one titanium comprising substance is provided in an amount from 0.1 to 20 wt.-% of titanium element, based on the total dry weight of the calcium carbonate-comprising material, preferably from 0.5 to 15 wt.-%, more preferably from 1.0 to 10 wt.-%, and most preferably from 2.5 to 7.5 wt.-%.

According to another embodiment of the present invention, the aqueous suspension formed in step d) has a solids content from 1 to 95 wt.-%, based on the total weight of the aqueous suspension, preferably from 3 to 75 wt.-%, more preferably from 5 to 50 wt.-%, even more preferably from 7 to 30 wt.-%, even still more preferably from 9 to 25 wt.-%, and most preferably from 10 to 20 wt.-% and/or wherein in step d) the calcium carbonate-comprising material is treated with a solution comprising the calcium phosphate of step b) and the at least one titanium comprising substance of step c).

According to another embodiment of the present invention, step e) is carried out at a pH value from 4.5 to 14, preferably at a pH value from 4.7 to 13.5, more preferably at a pH value from 5 to 13, even more preferably at a pH value from 5.5 to 12.5, even more preferably at a pH value from 6 to 12 and most preferably at a pH value from 6.0 to 8.0.

According to another embodiment of the present invention, step d) and/or step e) is carried out at a temperature from 10 to 100° C., preferably from 15 to 80° C., more preferably from 20 to 50° C., and most preferably at 20±2° C.

According to another embodiment of the present invention, the dicalcium phosphate is produced by the following steps:

i) providing a calcium ion source excluding dicalcium phosphate, preferably providing a calcium carbonate-comprising material, more preferably providing natural ground calcium carbonate, ii) providing a phosphate ion source selected from the group consisting of phosphoric acid, a salt thereof, and a mixture thereof, preferably phosphoric acid and iii) contacting the calcium ion source of step i) and the phosphate ion source of step ii) in the presence of water to form dicalcium phosphate, wherein the calcium ion source of step i) and the phosphate ion source of step ii) in combination are provided in a calcium ion to phosphate ion molar ratio from 1:2 to 5:1, preferably from 2:3 to 2:1, more preferably from 3:4 to 3:2, even more preferably from 5:6 to 4:3, still more preferably 10:11 to 11:10, and most preferably about 1:1.

According to another embodiment of the present invention, steps b) and d) are replaced by the following steps B) an D)):

B) providing a phosphate ion source selected from phosphoric acid, a salt thereof, or a mixture thereof, and D) treating the calcium carbonate-comprising material of step a) with the phosphate ion source of step B) in an aqueous medium to form an aqueous suspension comprising dicalcium phosphate, wherein the calcium carbonate-comprising material of step a) and the phosphate ion source of step B) in combination are provided in a calcium ion to phosphate ion molar ratio $(Ca^{2+}:PO_4^{3-})$ in the range from 1.75:1 to 100:1.

According to another embodiment of the present invention, the phosphate ion source is phosphoric acid, a hydrogen-free salt of phosphoric acid, a monohydrogen salt of phosphoric acid, preferably $Na_2HPO_4$, or a dihydrogen salt of phosphoric acid, or a mixture thereof, preferably the phosphate ion source is phosphoric acid, a dihydrogen salt of phosphoric acid, or a mixture thereof, preferably the phosphate ion source is selected from the group consisting of phosphoric acid, $NaH_2PO_4$, $KH_2PO_4$, $LiH_2PO_4$, $NH_4H_2PO_4$, $Ca(H_2PO_4)_2$, $Mg(H_2PO_4)_2$, and mixtures thereof.

According to another embodiment of the present invention, the process further comprises a step f) of separating the white UV-absorbing surface-reacted calcium carbonate doped with a titanium species from the aqueous suspension obtained in step e) and preferably step f) is done by solvent evaporation and/or pressure filtration and/or wherein the process further comprises a step g) of drying the surface-reacted calcium carbonate doped with a titanium species after step e) or after step f), if present, at a temperature in the range from 60 to 600° C., preferably from 80 to 450° C., most preferably from 95 to 400° C., preferably until the moisture content of the surface-reacted calcium carbonate doped with a titanium species is less than 1 wt.-%, based on the total weight of the dried surface-reacted calcium carbonate.

It should be understood that for the purposes of the present invention, the following terms have the following meanings:

A "white" pigment or "white" particle or "white" filler material in the meaning of the present invention is a solid inorganic colouring material having a defined chemical composition and a characteristic crystalline structure. Such a material is insoluble in water and, thus, results in a suspension when contacted with water. It has a white appearance when illuminated by daylight.

"UV-absorbing" pigments or particles in the meaning of the present invention absorb at least some of the ultraviolet B (UV-B) radiation which ranges from 280 to 320 nm and/or the ultraviolet A (UV-A) radiation which ranges from >320 to 400 nm.

The term "acid" as used herein refers to an acid in the meaning of the definition by Brønsted and Lowry (e.g., $H_2SO_4$, $HSO_4^-$), wherein the term "free acid" refers only to those acids being in the fully protonated form (e.g., $H_2SO_4$).

The term "surface-reacted" in the meaning of the present application shall be used to indicate that a material has been subjected to a process comprising partial dissolution of said material in aqueous environment followed by a crystallization process on and around the surface of said material, which may occur in the absence of presence of further crystallization additives. A "surface-reacted calcium carbonate" in the meaning of the present invention is a reaction product of a calcium carbonate-comprising material with calcium phosphate selected from monocalcium phosphate and/or dicalcium phosphate in an aqueous medium during grinding at a pH value of at least 4.2 wherein the calcium carbonate-comprising material and the calcium phosphate in combination have a calcium ion to phosphate ion molar ratio $(Ca^{2+}:PO_4^{3-})$ in the range from 1.75:1 to 100:1.

A "calcium carbonate-comprising material" in the meaning of the present invention is a mineral material or a synthetic material having a content of calcium carbonate of at least 80 wt.-%, preferably 85 wt.-%, more preferably 90 wt.-%, and most preferably 95 wt.-%, based on the total weight of the calcium carbonate-comprising material.

"Natural ground calcium carbonate" (GCC also known as GNCC) in the meaning of the present invention is a calcium carbonate obtained from natural sources, such as limestone, marble, or chalk, and processed through a wet and/or dry treatment such as grinding, screening and/or fractionating, for example, by a cyclone or classifier.

"Precipitated calcium carbonate" (PCC) in the meaning of the present invention is a synthesised material, obtained by precipitation following reaction of carbon dioxide and lime in an aqueous, semi-dry or humid environment or by precipitation of a calcium and carbonate ion source in water. PCC may be in the vateritic, calcitic or aragonitic crystal form. PCCs are described, for example, in EP2447213 A1, EP2524898 A1, EP2371766 A1, EP1712597 A1, EP1712523 A1, or WO2013142473 A1.

A "titanium comprising substance" in the meaning of the present invention is a substance that comprises titanium in form of ions or in form of covalent bondings having a oxidation number different to zero.

A surface-reacted calcium carbonate "doped" with a titanium species refers to a surface-reacted calcium carbonate wherein a titanium species is introduced in the structure of the calcium carbonate. The titanium species refers to titanium in oxidation numbers different to zero.

A "salt" in the meaning of the present invention is a chemical compound consisting of an assembly of cations and anions (cf. IUPAC, Compendium of Chemical Terminology, $2^{nd}$ Ed. (the "gold book"), 1997, "salt").

The "particle size" of particulate materials other than surface-reacted calcium carbonate (e.g., GCC or PCC) herein is described by its distribution of particle sizes $d_x$ (wt). Therein, the value $d_x$ (wt) represents the diameter relative to which x % by weight of the particles have diameters less than $d_x$ (wt). This means that, for example, the $d_{50}$ (wt) value is the particle size at which 20 wt. % of all particles are smaller than that particle size. The $d_{50}$ (wt) value is thus the weight median particle size, i.e. 50 wt. % of all particles are smaller than that particle size and the $d_{98}$ (wt) value, referred to as weight-based top cut, is the particle size at which 98 wt. % of all particles are smaller than that particle size. The weight-based median particle size do (wt) and top cut $d_{98}$ (wt) are measured by the sedimentation method, which is an analysis of sedimentation behaviour in a gravimetric field. The measurement is made with a Sedigraph™ 5120 of Micromeritics Instrument Corporation, USA. The method and the instrument are known to the skilled person and are commonly used to determine particle size distributions. The measurement is carried out in an aqueous solution of 0.1 wt. % $Na_4P_2O_7$. The samples are dispersed using a high speed stirrer and sonication.

The "particle size" of surface-reacted calcium carbonate herein is described as volume-based particle size distribution $d_x$ (vol). Therein, the value $d_x$ (vol) represents the diameter relative to which x % by volume of the particles have diameters less than $d_x$ (vol). This means that, for example, the $d_{20}$ (vol) value is the particle size at which 20 vol. % of all particles are smaller than that particle size. The $d_{50}$ (vol) value is thus the volume median particle size, i.e. 50 vol. % of all particles are smaller than that particle size and the $d_{96}$ (vol) value, referred to as volume-based top cut, is the particle size at which 98 vol. % of all particles are smaller than that particle size. Volume median particle size $d_{50}$ was evaluated using a Malvern Mastersizer 3000 Laser Diffraction System. The $d_{50}$ or $d_{98}$ value, measured using a Malvern Mastersizer 3000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005.

For the purpose of the present invention the "porosity" or "pore volume" refers to the intra-particle intruded specific pore volume. In the context of the present invention, the term "pore" is to be understood as describing the space that is found between and/or within particles, i.e. that is formed by the particles as they pack together under nearest neighbour contact (interparticle pores), such as in a powder or a compact, and/or the void space within porous particles (intraparticle pores), and that allows the passage of liquids under pressure when saturated by the liquid and/or supports absorption of surface wetting liquids.

The specific pore volume is measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 μm. The equilibration time used at each pressure step is 20 s. The sample material is sealed in a 3 cm³ chamber powder penetrometer for analysis. The data are corrected for mercury compression, penetrometer expansion and sample material elastic compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", *Industrial and Engineering Chemistry Research,* 1996, 35 (5), 1753-1764).

The total pore volume seen in the cumulative intrusion data is separated into two regions with the intrusion data from 214 μm down to about 1 to 4 μm showing the coarse packing of the sample between any agglomerate structures contributing strongly. Below these diameters lies the fine interparticle packing of the particles themselves. If they also have intraparticle pores, then this region appears bimodal, and by taking the specific pore volume intruded by mercury into pores finer than the modal turning point, i.e. finer than the bimodal point of inflection, we thus define the specific intraparticle pore volume. The sum of these three regions gives the total overall pore volume of the powder, but depends strongly on the original sample compaction/settling of the powder at the coarse pore end of the distribution.

By taking the first derivative of the cumulative intrusion curve, the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

Throughout the present document, the term "specific surface area" (in m²/g), which is used to define functionalized calcium carbonate or other materials, refers to the specific surface area as determined by using the BET method (using nitrogen as absorbing gas). Throughout the present document, the specific surface area (in m²/g) is determined using the BET method (using nitrogen as absorbing gas), which is well known to the skilled man (ISO 9277:2010). The total surface area (in m²) of the filler material is then obtained by multiplication of the specific surface area and the mass (in g) of the corresponding sample.

For the purpose of the present application, "water-insoluble" materials are defined as materials which, when 100 g of said material is mixed with 100 g deionised water and filtered on a filter having a 0.2 μm pore size at 20° C. to recover the liquid filtrate, provide less than or equal to 1 g of recovered solid material following evaporation at 95 to 100° C. of 100 g of said liquid filtrate at ambient pressure. "Water-soluble" materials are defined as materials which, when 100 g of said material is mixed with 100 g deionised water and filtered on a filter having a 0.2 μm pore size at 20° C. to recover the liquid filtrate, provide more than 1 g of recovered solid material following evaporation at 95 to 100° C. of 100 g of said liquid filtrate at ambient pressure.

For the purpose of the present invention, the "solids content" of a liquid composition is a measure of the amount of material remaining after all the solvent or water has been evaporated. If necessary, the "solids content" of a suspension given in wt.-% in the meaning of the present invention can be determined using a Moisture Analyzer HR73 from Mettler-Toledo (T=120° C., automatic switch off 3, standard drying) with a sample size of 5 to 20 g.

Unless specified otherwise, the term "drying" refers to a process according to which at least a portion of water is removed from a material to be dried such that a constant weight of the obtained "dried" material at 220° C. is reached. The term "dry" material or "dry" composition, is understood to be a material/composition having less than 1.0% by weight of water relative to the material/composition weight. The % water (equal to residual total moisture content) is determined according to the Coulometric Karl Fischer measurement method, wherein the material/composition is heated to 220° C., and the water content released as vapour and isolated using a stream of nitrogen gas (at 100 ml/min) is determined in a Coulometric Karl Fischer unit.

For the purpose of the present invention, the term "viscosity" or "Brookfield viscosity" refers to Brookfield viscosity. The Brookfield viscosity is for this purpose measured by a Brookfield DV-II+ Pro viscometer at 25° C.±1° C. at 100 rpm using an appropriate spindle of the Brookfield RV-spindle set and is specified in mPa·s. Based on his technical knowledge, the skilled person will select a spindle from the Brookfield RV-spindle set which is suitable for the viscosity range to be measured. For example, for a viscosity range between 200 and 800 mPa·s the spindle number 3 may be used, for a viscosity range between 400 and 1 600 mPa's the spindle number 4 may be used, for a viscosity range between 800 and 3 200 mPa's the spindle number 5 may be used, for a viscosity range between 1 000 and 2 000 000 mPa's the spindle number 6 may be used, and for a viscosity range between 4 000 and 8 000 000 mPa's the spindle number 7 may be used.

A "suspension" or "slurry" in the meaning of the present invention comprises undissolved solids and water, and optionally further additives, and usually contains large amounts of solids and, thus, is more viscous and can be of higher density than the liquid from which it is formed.

Where an indefinite or definite article is used when referring to a singular noun, e.g., "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

Whenever the terms "including" or "having" are used, these terms are meant to be equivalent to "comprising" as defined hereinabove.

DETAILED DESCRIPTION OF THE INVENTION

The inventive process for producing the white UV-absorbing surface-reacted calcium carbonate doped with a titanium species comprises the steps of a) providing a calcium carbonate-comprising material, b) providing a calcium phosphate selected from monocalcium phosphate and/or dicalcium phosphate, c) providing at least one titanium comprising substance, and d) treating the calcium carbonate-comprising material of step a) with the calcium phosphate of step b) in an aqueous medium to form an aqueous suspension and e) grinding the aqueous suspension of step d) at a pH value of at least 4.2 to form an aqueous suspension of a white UV-absorbing surface-reacted calcium carbonate doped with a titanium species, wherein the calcium carbonate-comprising material of step a) and the calcium phosphate of step b) in combination have a calcium ion to phosphate ion molar ratio ($Ca^{2+}:PO_4^{3-}$) in the range from 1.75:1 to 100:1, and wherein the at least one titanium comprising substance of step c) is added before and/or during and/or after step d) and/or before and/or during step e).

In the following preferred embodiments of the inventive white UV-absorbing surface-reacted calcium carbonate doped with a titanium species will be set out in more detail. It is to be understood that these embodiments and details also apply to the inventive products and uses thereof as well as to the inventive process for preparing said white UV-absorbing surface-reacted calcium carbonate doped with a titanium species.

Process Step a)

According to step a) of the process of the present invention, a calcium-carbonate comprising material is provided.

According to one embodiment the at least one calcium carbonate-comprising material has a content of calcium carbonate of at least 80 wt.-%, preferably 85 wt.-%, more preferably 90 wt.-%, and most preferably 95 wt.-%, based on the total weight of the calcium carbonate-comprising material. According to another embodiment the at least one calcium carbonate comprising material consists of calcium carbonate.

The calcium carbonate-comprising material may be selected from natural ground calcium carbonate, precipitated calcium carbonate, or mixtures thereof. The natural ground calcium carbonate may be preferably selected from marble, limestone and/or chalk, and/or the precipitated calcium carbonate may be preferably selected from vaterite, calcite and/or aragonite.

According to one embodiment of the present invention, the calcium carbonate-comprising material is a natural ground calcium carbonate and/or a precipitated calcium carbonate, preferably the natural ground calcium carbonate is selected from the group consisting of marble, chalk, limestone, and mixtures thereof, and/or the precipitated calcium carbonate is selected from the group consisting of precipitated calcium carbonates having an aragonitic, vateritic or calcitic crystal form, and mixtures thereof.

"Natural ground calcium carbonate" (GCC) is understood to be manufactured from a naturally occurring form of calcium carbonate, mined from sedimentary rocks such as limestone or chalk, or from metamorphic marble rocks, eggshells or seashells. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Ground calcium carbonate is almost exclusively of the calcitic polymorph, which is said to be trigonal-rhombohedral and represents the most stable form of the calcium carbonate polymorphs. The term "source" of the calcium carbonate in the meaning of the present application refers to the naturally occurring mineral material from which the calcium carbonate is obtained. The source of the calcium carbonate may comprise further naturally occurring components such as magnesium carbonate, alumino silicate etc.

In general, the grinding of natural ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate containing mineral material comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

According to one embodiment of the present invention the source of natural ground calcium carbonate (GCC) is selected from marble, chalk, limestone, or mixtures thereof. Preferably, the source of ground calcium carbonate is marble, and more preferably magnesitic marble. According to one embodiment of the present invention the GCC is obtained by dry grinding. According to another embodiment of the present invention the GCC is obtained by wet grinding and subsequent drying.

According to one embodiment of the present invention, the calcium carbonate comprises one type of natural ground calcium carbonate. According to another embodiment of the present invention, the calcium carbonate comprises a mixture of two or more types of natural ground calcium carbonates selected from different sources.

"Precipitated calcium carbonate" (PCC) in the meaning of the present invention is a synthesized material, generally obtained by precipitation following reaction of carbon dioxide and calcium hydroxide in an aqueous environment or by precipitation of calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment of the present invention, the calcium carbonate is precipitated calcium carbonate, preferably comprising aragonitic, vateritic or calcitic mineralogical crystal forms or mixtures thereof.

Precipitated calcium carbonate may be ground prior to the treatment with carbon dioxide and at least one $H_3O^+$ ion donor by the same means as used for grinding natural ground calcium carbonate as described above.

According to one embodiment of the present invention, the calcium carbonate-comprising material is in form of particles having a weight median particle size $d_{50}$ (wt) from 0.05 to 500 µm, preferably from 0.2 to 200 µm, more preferably from 0.4 to 100 µm, and most preferably from 0.6 to 20 µm, and/or a weight top cut particle size $d_{98}$ (wt) from 0.15 to 1500 µm, preferably from 1 to 600 µm, more preferably from 1.5 to 300 µm, and most preferably from 2 to 80 µm.

The calcium carbonate-comprising material may have a specific surface area (BET) from 1 to 100 $m^2/g$, as measured using nitrogen and the BET method according to ISO 9277:2010. According to one embodiment the specific surface area (BET) of the calcium carbonate-comprising material is from 1 to 80 $m^2/g$, preferably from 2 to 60 $m^2/g$, and more preferably from 2 to 15 $m^2/g$, as measured using nitrogen and the BET method according to ISO 9277:2010.

The calcium carbonate-comprising material may also be selected from a waste material or by-product containing the calcium carbonate-comprising material. For example, the waste material or by-product may be selected from industrial reject material, recycled waste material, waste material derived from pulp- and/or papermaking industry, industrial gypsum wastes, or pigment-discoloured natural calcitic material or biologically produced minerals such as eggshells, oyster/clam shells.

The calcium carbonate-comprising material of step a) may be provided in any form, for example, as solution, suspension, slurry, dispersion, paste, powder, moist filter cake or in pressed or granulated form. According to one embodiment, the calcium carbonate-comprising material of step a) is provided in dry form, preferably in form of a powder.

According to another embodiment the calcium carbonate-comprising material may be used dry or in form of an aqueous suspension. According to a preferred embodiment, the calcium carbonate-comprising material is in form of an aqueous suspension having a solids content within the range of 1 wt.-% to 95 wt.-%, preferably 10 wt.-% to 90 wt.-%, more preferably 20 wt.-% to 80 wt.-%, and most preferably 30 wt.-% to 70 wt.-%, based on the weight of the aqueous suspension.

The term "aqueous" suspension refers to a system, wherein the liquid phase comprises, preferably consists of, water. However, said term does not exclude that the liquid phase of the aqueous suspension comprises minor amounts of at least one water-miscible organic solvent selected from the group comprising methanol, ethanol, acetone, acetonitrile, tetrahydrofuran and mixtures thereof. If the aqueous suspension comprises at least one water-miscible organic solvent, the liquid phase of the aqueous suspension comprises the at least one water-miscible organic solvent in an amount of from 0.1 to 40.0 wt.-% preferably from 0.25 to 30.0 wt.-%, more preferably from 0.5 to 20.0 wt.-% and most preferably from 1.0 to 10.0 wt.-%, based on the total weight of the liquid phase of the aqueous suspension. Preferably, the liquid phase of the aqueous suspension consists of water.

According to a preferred embodiment of the present invention, the aqueous suspension consists of water and the calcium carbonate-comprising material.

Alternatively, the aqueous suspension of the calcium carbonate-comprising material may comprise further additives, for example, a dispersant. A suitable dispersant may be selected from polyphosphates, and is in particular a tripolyphosphate. Another suitable dispersant may be selected from the group comprising homopolymers or copolymers of polycarboxylic acid salts based on, for example, acrylic acid, methacrylic acid, maleic acid, fumaric acid or itaconic acid and acrylamide or mixtures thereof. The homopolymers or copolymers of polycarboxylic acid salts can be fully or partially neutralized, for example, at least 70%, or at least 80% or at least 90% of the acid groups are neutralized. Neutralizing means that the protons of the carboxylic acids are exchanged with another cation such as, for example, sodium and/or calcium ions. According to a preferred embodiment, the homopolymers or copolymers of polycarboxylic acid salts are fully neutralized and most preferably are fully neutralized with sodium and/or calcium ions. Fully or partially neutralized homopolymers or copolymers of acrylic acid are especially preferred. Most preferred are homopolymers or copolymers of acrylic acid that are fully neutralized with sodium and/or calcium ions. The weight average molecular weight Mw of such products is preferably in the range from 2 000 to 15 000 g/mol, with a weight average molecular weight Mw from 3 000 to 7 000 g/mol or 3 500 to 6 000 g/mol being especially preferred. According to an exemplary embodiment, the dispersant is sodium polyacrylate having a weight average molecular weight Mw from 2 000 to 15 000 g/mol, preferably from 3 000 to 7 000 g/mol, and most preferably from 3 500 to 6 000 g/mol.

According to one embodiment of the present invention, the calcium carbonate-comprising material provided in process step a) is natural ground calcium carbonate and/or precipitated calcium carbonate, preferably an aqueous suspension of natural ground calcium carbonate and/or precipitated calcium carbonate having a solids content within the range of 1 wt.-% to 95 wt.-%, preferably 10 wt.-% to 90 wt.-%, more preferably 20 wt.-% to 80 wt.-%, and most preferably 30 wt.-% to 70 wt.-%, based on the weight of the aqueous suspension.

According to one embodiment of the present invention, the calcium carbonate-comprising material, preferably natural ground calcium carbonate and/or precipitated calcium carbonate, and more preferably natural ground calcium carbonate and/or precipitated calcium carbonate provided in dry form.

Process Step b)

According to step b) of the process of the present invention, a calcium phosphate selected from monocalcium phosphate and/or dicalcium phosphate is provided. The calcium carbonate-comprising material of step a) and the calcium phosphate selected from monocalcium phosphate and/or dicalcium phosphate of step b) in combination have a calcium ion to phosphate ion molar ratio ($Ca^{2+}:PO_4^{3-}$) in the range from 1.75:1 to 100:1.

For the purpose of the present invention, the term "monocalcium phosphate" refers to the inorganic compound with the chemical formula $Ca(H_2PO_4)_2$ and hydrates thereof. Examples of monocalcium phosphate are anhydrous monocalcium phosphate ($Ca(H_2PO_4)_2$) or monocalcium phosphate monohydrate ($Ca(H_2PO_4)_2 \cdot H_2O$).

A "dicalcium phosphate" in the meaning of the present invention refers to the inorganic compound with the chemical formula $CaHPO_4$ and hydrates thereof. Examples of dicalcium phosphate are anhydrous dicalcium phosphate ($CaHPO_4$) such as the mineral monetite, dicalcium phosphate hemihydrate ($CaHPO_4 \cdot 0.5 \ H_2O$), or dicalcium phosphate dihydrate ($CaHPO_4 \cdot 2 \ H_2O$), such as the mineral brushite.

According to one embodiment, the calcium phosphate provided in step b) of the process of the present invention is selected from anhydrous monocalcium phosphate ($Ca(H_2PO_4)_2$), monocalcium phosphate monohydrate ($Ca(H_2PO_4)_2 \cdot H_2O$), anhydrous dicalcium phosphate ($CaHPO_4$), dicalcium phosphate hemihydrate ($CaHPO_4 \cdot 0.5 \ H_2O$), dicalcium phosphate dihydrate ($CaHPO_4 \cdot 2 \ H_2O$), or mixtures thereof, preferably the calcium phosphate provided in step b) of the process of the present invention is selected from anhydrous dicalcium phosphate ($CaHPO_4$), dicalcium phosphate hemihydrate ($CaHPO_4 \cdot 0.5 \ H_2O$), dicalcium phosphate dihydrate ($CaHPO_4 \cdot 2 \ H_2O$), or mixtures thereof, and more preferably the calcium phosphate provided in step b) of the process of the present invention is dicalcium phosphate dihydrate ($CaHPO_4 \cdot 2 \ H_2O$).

According to one embodiment, the calcium phosphate provided in step b) of the process of the present invention is a dicalcium phosphate, preferably selected from anhydrous dicalcium phosphate ($CaHPO_4$), dicalcium phosphate hemihydrate ($CaHPO_4 \cdot 0.5 \ H_2O$), dicalcium phosphate dihydrate ($CaHPO_4 \cdot 2 \ H_2O$), or mixtures thereof, and more preferably the dicalcium phosphate is dicalcium phosphate dihydrate ($CaHPO_4 \cdot 2 \ H_2O$).

According to one embodiment the calcium carbonate-comprising material of step a) and the calcium phosphate selected from monocalcium phosphate and/or dicalcium phosphate of step b) in combination have a calcium ion to phosphate ion molar ratio ($Ca^{2+}:PO_4^{3-}$) in the range from 1.9:1 to 75:1, preferably from 2:1 to 50:1, more preferably from 2.2:1 to 25:1, and most preferably from 2.5:1 to 10:1.

According to one embodiment the calcium phosphate of step b) is dicalcium phosphate dihydrate and is provided in an amount from 1.7 to 230 wt.-%, based on the total weight of the calcium carbonate-comprising material of step a), preferably from 2.3 to 191 wt.-%, more preferably from 3.5 to 172 wt.-%, and most preferably from 19 to 115 wt.-%.

According to another embodiment the calcium phosphate of step b) is dicalcium phosphate hemihydrate and is provided in an amount from 1.7 to 230 wt.-%, based on the total weight of the calcium carbonate-comprising material of step a), preferably from 2.3 to 191 wt.-%, more preferably from 3.5 to 172 wt.-%, and most preferably from 19 to 115 wt.-%.

According to another embodiment the calcium phosphate of step b) is anhydrous dicalcium phosphate and is provided in an amount from 1.4 to 181 wt.-%, based on the total weight of the calcium carbonate-comprising material of step a), preferably from 1.8 to 151 wt.-%, more preferably from 2.8 to 136 wt.-%, and most preferably from 15 to 91 wt.-%.

According to another embodiment the calcium phosphate of step b) is anhydrous monocalcium phosphate and is provided in an amount from 1.2 to 94 wt.-%, based on the total weight of the calcium carbonate-comprising material of step a), preferably from 1.6 to 84 wt.-%, more preferably from 2.4 to 78 wt.-%, and most preferably from 12 to 59 wt.-%.

According to one embodiment the calcium phosphate of step b) is monocalcium phosphate monohydrate and is provided in an amount from 1.3 to 100 wt.-%, based on the total weight of the calcium carbonate-comprising material of step a), preferably from 1.7 to 90 wt.-%, more preferably from 2.5 to 84 wt.-%, and most preferably from 13 to 63 wt.-%.

According to another embodiment, the calcium phosphate of step b) is in form of particles having a weight median particle size $d_{50}$ (wt) from 0.05 to 500 μm, preferably from 0.2 to 200 μm, more preferably from 0.4 to 100 μm, and most preferably from 0.6 to 40 μm. Additionally or alternatively, the calcium phosphate of step b) may be in form of particles having a weight top cut particle size $d_{98}$ (wt) from 0.15 to 1500 μm, preferably from 1 to 600 μm, more preferably from 1.5 to 300 μm, and most preferably from 2 to 110 μm.

According to one embodiment, the calcium phosphate of step b) is a dicalcium phosphate and is in form of particles having a weight median particle size $d_{50}$ (wt) from 0.05 to 500 μm, preferably from 0.2 to 200 μm, more preferably from 0.4 to 100 μm, and most preferably from 0.6 to 40 μm, and/or a weight top cut particle size $d_{98}$ (wt) from 0.15 to 1500 μm, preferably from 1 to 600 μm, more preferably from 1.5 to 300 μm, and most preferably from 2 to 110 μm.

The calcium phosphate of step b) may have a specific surface area (BET) from 0.1 to 200 m²/g, as measured using nitrogen and the BET method according to ISO 9277:2010. According to one embodiment the specific surface area (BET) of the calcium phosphate of step b) is from 0.2 to 100 m²/g, preferably from 0.3 to 60 m²/g, and more preferably from 0.5 to 30 m²/g, as measured using nitrogen and the BET method according to ISO 9277:2010.

The calcium phosphate of step b) may be provided in any form, for example, as suspension, slurry, dispersion, paste, powder, moist filter cake or in pressed or granulated form. According to one embodiment, the calcium phosphate of step b) is provided in dry form, preferably in form of a powder.

According to another embodiment, the calcium phosphate of step b) is provided in form of an aqueous suspension, preferably having a solids content within the range of 1 to 90 wt.-%, more preferably from 3 to 60 wt.-%, even more preferably from 5 to 40 wt.-%, and most preferably from 10 to 25 wt.-%, based on the weight of the aqueous suspension. According to a preferred embodiment of the present invention, the aqueous suspension consists of water and the calcium phosphate of step b). Alternatively, the aqueous suspension of the calcium phosphate of step b) may comprise further additives, for example, a dispersant. Another suitable dispersant may be selected from the group comprising homopolymers or copolymers of polycarboxylic acid or salts thereof based on, for example, acrylic acid, methacrylic acid, maleic acid, fumaric acid or itaconic acid, and acrylamide, or mixtures thereof. Homopolymers or copolymers of acrylic acid are especially preferred. The homopolymer or copolymer can be fully in the acidic form or partially or fully neutralized. The weight average molecular weight Mw of such products is preferably in the range from 2 000 to 15 000 g/mol, with a weight average molecular weight Mw from 3 000 to 7 000 g/mol or 3 500 to 6 000 g/mol being especially preferred. According to an exemplary embodiment, the dispersant is sodium polyacrylate having a weight average molecular weight Mw from 2 000 to 15 000 g/mol, preferably from 3 000 to 7 000 g/mol, and most preferably from 3 500 to 6 000 g/mol.

Monocalcium phosphate and dicalcium phosphate are commercially available or may be produced on site, for example, by treating calcium hydroxide or calcium carbonate with phosphoric acid.

According to one embodiment, the calcium phosphate provided in process step b) is dicalcium phosphate. The dicalcium phosphate may be produced in-situ or in a separate process.

According to one embodiment the separate process for producing dicalcium phosphate comprises the following steps:

i) providing a calcium ion source excluding dicalcium phosphate, preferably providing a calcium carbonate-comprising material, more preferably providing natural ground calcium carbonate, i) providing a phosphate ion source selected from phosphoric acid, a salt thereof, or a mixture thereof, and iii) contacting the calcium ion source of step i) and the phosphate ion source of step ii) in the presence of water to form dicalcium phosphate, wherein the calcium ion source of step i) and the phosphate ion source of step ii) in combination are provided in a calcium ion to phosphate ion molar ratio from 1:2 to 5:1.

The calcium ion source may be selected from a calcium carbonate-comprising material, calcium oxide, calcium hydroxide, calcium chloride, calcium nitrate, calcium chlorate, calcium bromide, calcium iodide, calcium acetate, calcium sulphate, calcium citrate, or mixtures thereof. According to one embodiment the calcium ion source excludes calcium phosphate.

According to one embodiment the calcium ion source is selected from a calcium carbonate-comprising material, calcium chlorate, calcium bromide, calcium iodide, calcium acetate, calcium sulphate, or mixtures thereof, preferably the calcium ion source is selected from a calcium carbonate-comprising material, calcium acetate, calcium sulphate, or mixtures thereof, and most preferably the calcium ion source is a calcium carbonate-comprising material. According to a preferred embodiment, the calcium ion source is a calcium carbonate-comprising material, preferably selected from natural ground calcium carbonate, precipitated calcium carbonate, dolomite, or mixtures thereof, more preferably selected from natural ground calcium carbonate, precipitated calcium carbonate, or mixtures thereof, and most preferably the calcium carbonate-comprising material is natural ground calcium carbonate. The calcium carbonate comprising material has already been described under step a).

The calcium ion source may also be selected from a waste material or by-product containing calcium compounds in an acid soluble form. For example, the waste material or by-product may be selected from industrial reject material, recycled waste material, waste material derived from pulp- and/or papermaking industry, industrial gypsum wastes, or pigment-discoloured natural calcitic material or biologically produced minerals such as eggshells, oyster/clam shells.

The calcium ion source can be provided in solid form or in form of an aqueous suspension of an aqueous solution.

According to one embodiment, the calcium ion source is provided in form of a solution, preferably comprising the calcium ion source in an amount from 0.1 to 99 wt.-%, based on the total weight of the aqueous solution, more preferably in an amount from 1 to 80 wt.-%, even more preferably in an amount from 10 to 50 wt.-%, and most preferably in an amount from 20 to 40 wt.-%. According to another embodiment the calcium ion source is provided in form of an aqueous suspension, preferably comprising the calcium ion source in an amount from 0.1 to 99 wt.-%, based on the total weight of the aqueous suspension, preferably in an amount from 1 to 80 wt.-%, more preferably in an amount from 10 to 50 wt.-%, and most preferably in an amount from 20 to 40 wt.-%. According to one embodiment, the calcium ion source provided in step i) of the aforementioned separate process for producing dicalcium phosphate is the same as the calcium carbonate-comprising material provided in step a) of the process of the present invention.

According to another embodiment the dicalcium phosphate is produced in-situ in the process of the present invention. Accordingly, process steps b) and d) of the process of the present invention are replaced by process steps ii) and iii) described above, i.e. process steps b) and d) are replaced by the following steps B) and D):

B) providing a phosphate ion source selected from phosphoric acid, a salt thereof, or a mixture thereof, and D) treating the calcium carbonate-comprising material of step a) with the phosphate ion source of step B) in an aqueous medium to form an aqueous suspension comprising dicalcium phosphate, wherein the calcium carbonate-comprising material of step a) and the phosphate ion source of step B) in combination are provided in a calcium ion to phosphate ion molar ratio ($Ca^{2+}:PO_4^{3-}$) in the range from 1.75:1 to 100:1.

Thus, the in-situ process for producing a white UV-absorbing surface-reacted calcium carbonate doped with a titanium species comprises the steps of:

a) providing a calcium carbonate-comprising material,

B) providing a phosphate ion source selected from phosphoric acid, a salt thereof, or a mixture thereof, c) providing at least one titanium comprising substance, D) treating the calcium carbonate-comprising material of step a) with the phosphate ion source of step B) in an aqueous medium to form an aqueous suspension comprising dicalcium phosphate, and e) grinding the aqueous suspension of step D) at a pH value of at least 4.2 to form an aqueous suspension of a white UV-absorbing surface-reacted calcium carbonate doped with a titanium species, wherein the calcium carbonate-comprising material of step a) and the phosphate ion source of step B) in combination have a calcium ion to phosphate ion molar ratio ($Ca^{2+}:PO_4^{3-}$) in the range from 1.75:1 to 100:1, and wherein the at least one titanium comprising substance of step c) is added before and/or during and/or after step D) and/or before and/or during step e).

Unless indicated otherwise, the following explanations and embodiments apply to both the separate process for producing dicalcium phosphate and the in-situ process for producing an aqueous suspension of white UV-absorbing surface-reacted calcium carbonate doped with a titanium species, in which the dicalcium phosphate is formed in-situ.

According to one embodiment, the phosphate ion source is phosphoric acid. According to another embodiment, the phosphate ion source is a salt of phosphoric acid, e.g. a hydrogen-free salt, a monohydrogen salt, preferably $Na_2HPO_4$, or a dihydrogen salt of phosphoric acid, preferably the phosphate ion source is a dihydrogen salt of phosphoric acid, more preferably selected from the group consisting of $NaH_2PO_4$, $KH_2PO_4$, $LiH_2PO_4$, $NH_4H_2PO_4$, $Ca(H_2PO_4)_2$, $Mg(H_2PO_4)_2$, and mixtures thereof. The phosphate ion source may also be a mixture of phosphoric acid and a salt thereof. According to one embodiment the phosphate ion source is a mixture of phosphoric acid and a hydrogen-free salt, a monohydrogen salt, preferably $Na_2HPO_4$, or a dihydrogen salt thereof, preferably a mixture of phosphoric acid and a dihydrogen salt thereof, and more preferably a mixture of phosphoric acid and a dihydrogen salt thereof selected from the group consisting of $NaH_2PO_4$, $KH_2PO_4$, $LiH_2PO_4$, $NH_4H_2PO_4$, $Ca(H_2PO_4)_2$, $Mg(H_2PO_4)_2$ and mixtures thereof. The skilled person will appreciate that both the anhydrous forms and hydrates of the afore-mentioned salts of phosphoric acid can be used.

In addition, the phosphate ion source may comprise other suitable phosphate ion sources. For example, the phosphate ion source may comprise dibasic or tribasic salts of phosphoric acid.

The phosphate ion source may also be obtained from a waste material or by-product containing phosphoric acid, a dihydrogen salt thereof, or a mixture thereof.

The phosphate ion source can be provided in solid form or in form of an aqueous suspension or an aqueous solution.

According to one embodiment, the phosphate ion source is provided in form of a solution, preferably comprising the phosphate ion source in an amount from 0.1 to 99 wt.-%, based on the total weight of the aqueous solution, more preferably in an amount from 1 to 80 wt.-%, even more preferably in an amount from 10 to 50 wt.-%, and most preferably in an amount from 20 to 40 wt.-%. According to another embodiment the phosphate ion source is provided in form of an aqueous suspension, preferably comprising the phosphate ion source in an amount from 0.1 to 99 wt.-%, based on the total weight of the aqueous suspension, preferably in an amount from 1 to 80 wt.-%, more preferably in an amount from 10 to 50 wt.-%, and most preferably in an amount from 20 to 40 wt.-%.

According to one embodiment, the phosphate ion source is provided in solid form, preferably in form of a powder. The powder may contain small amounts of moisture, e.g. up to 1 wt.-%, based on the total weight of the powder.

According to one embodiment, in the separate process for producing dicalcium phosphate comprising steps i) to iii), the calcium ion source of step i) and the phosphate ion source of step ii) in combination are provided in a calcium ion to phosphate ion molar ratio ($Ca^{2+}:PO_4^{3-}$) from 2:3 to 2:1, preferably from 3:4 to 3:2, more preferably from 5:6 to 4:3, still more preferably from 10:11 to 11:10 and most preferably about 1:1

According to one embodiment, in the in-situ process comprising steps a), B), c), D) and e), wherein dicalcium phosphate is formed in-situ, the calcium carbonate-comprising material of step a) and the phosphate ion source of step B) in combination are provided in a calcium ion to phosphate ion molar ratio ($Ca^{2+}:PO_4^{3-}$) from 1.9:1 to 75:1, preferably from 2:1 to 50:1, more preferably from 2.2:1 to 25:1, and most preferably from 2.5:1 to 10:1.

According to one embodiment, in the separate process for producing dicalcium phosphate comprising steps i) to iii), the process step iii) is carried out at a pH value below 5, preferably at a pH value from 1.0 to 4.9, more preferably from 1.1 to 4.7, even more preferably from 1.8 to 4.2, and most preferably from 2.2 to 4.0. The pH value may be controlled by the amount of phosphate ion source.

Process Step c)

According to step c) of the process of the present invention at least one titanium comprising substance is provided.

According to one embodiment of the present invention the at least one titanium comprising substance is selected from the group consisting of a titanium salt, a titanium hydroxide, a titanium dioxide, and mixtures thereof.

According to a preferred embodiment of the present invention, the titanium comprising substance is selected from the group consisting of titanium bromide, titanium fluoride, titanium iodide, titanium chloride, titanyl sulfate, titanium hydroxide, titanium dioxide, and mixtures thereof and most preferably the titanium comprising substance is selected from titanium bromide, titanium fluoride, titanium iodide, titanium chloride, titanyl sulfate and mixtures thereof.

A "titanium salt" in the meaning of the present invention is a chemical compound consisting of an ionic assembly of cations (positively charged ions) comprising titanium and anions (negatively charged ions) so that the product is electrically neutral (without a net charge).

The anions can be inorganic anions, for example chloride ($Cl^-$), bromide ($Br^-$), fluoride ($F^-$), iodide ($I^-$), or organic anions, for example acetate ($CH_3CO^-_2$), sulfate ($SO^{2-}_4$), or nitrate ($NO_3^-$).

The cations can be titanium cations, for example $Ti^{2+}$, $Ti^{3+}$ or $Ti^{4+}$ cations.

Examples of suitable titanium salts are titanium bromide, for example $TiBr_4$ or $TIBr_3$, titanium fluoride, for example $TiF_4$ or $TiF_3$, titanium iodide ($TiI_4$), titanium chloride ($TiCl_4$), titanyl sulfate ($TiOSO_4$), titanium sulfate ($Ti_2(SO_4)_3$), titanium nitrate ($Ti(NO_3)_4$) or titanium acetate ($TiO_2H_3O_2)_4$). The titanium salt may be an anhydrous salt or a hydrate salt.

As used herein, a "hydrate" is an inorganic salt containing water molecules combined in a definite ratio as an integral part of the crystal. Depending on the number of water molecules per formula unit of salt, the hydrate may be designated as monohydrate, dihydrate, trihydrate, tetrahydrate, pentahydrate, hexahydrate, heptahydrate, octahydrate, nonahydrate, decahydrate, hemihydrates, etc.

"Titanium hydroxides" in the meaning of the present invention are chemical compounds comprising a diatomic anion with chemical formula $OH^-$. The hydroxide consists of an oxygen and hydrogen atom held together by a single covalent bond, and carries a negative electric charge. Examples of suitable titanium hydroxides are $Ti(OH)_4$ or $Ti(OH)_3$.

"Titanium dioxides" in the meaning of the present invention are chemical compounds comprising titanium and oxygen, wherein the oxygen has the oxidation number (II). Examples of suitable titanium dioxides are $TiO_2$, $TiO$, $Ti_2O_3$, $Ti_3O$ or $Ti_2O$, $\delta\text{-}TiO_x$ wherein x=0.68-0.75 or $Ti_nO_{2n-1}$ where n ranges from 3 to 9 inclusive.

According to a preferred embodiment the titanium comprising substance is selected from the group consisting of titanium bromide, titanium fluoride, titanium iodide, titanium chloride, titanyl sulfate, titanium hydroxide, titanium dioxide, and mixtures thereof and most preferably the titanium comprising substance is selected from titanium bromide, titanium fluoride, titanium iodide, titanium chloride, titanyl sulfate and mixtures thereof. According to a preferred embodiment the titanium comprising substance is titanyl sulfate, also known as titanium oxysulfate.

The titanium comprising substance can be a water-soluble or water-insoluble substance.

According to one embodiment the at least one titanium comprising substance is provided in an amount from 0.1 to 20 wt.-%, of titanium element, based on the total weight of the calcium carbonate-comprising material, preferably from 0.5 to 15 wt.-%, more preferably from 1.0 to 10 wt.-%, and most preferably from 2.5 to 7.5 wt.-%. The term "titanium element" in the meaning of the present invention refers to the weight of the titanium in the titanium comprising substance, assuming that the titanium is present as $Ti^0$, also known as elemental titanium in the titanium comprising substance.

According to another embodiment the at least one titanium comprising substance is provided in an amount from 0.1 to 20 mol.-%, of titanium, based on the total amount of the calcium carbonate-comprising material, preferably from 0.5 to 15 mol.-%, more preferably from 1.0 to 10 mol.-%, and most preferably from 2.5 to 7.5 mol.-%.

The at least one titanium comprising substance can be provided in form of a solution, a suspension or as a dry material.

According to one embodiment the at least one titanium comprising substance is provided as dry material. The dry material may be in the form of powder, flakes, granules etc. and most preferably is in the form of a powder.

According to another embodiment the at least one titanium comprising substance is provided in form of an solution or suspension. Preferably, the solution or suspension comprises the at least one titanium comprising substance in an amount from 0.01 to 10 wt.-%, based on the total weight of the solution or suspension, preferably in an amount from 0.1 to 8.0 wt.-%, more preferably in an amount from 0.4 to 5.0 wt.-%, and most preferably in an amount from 0.8 to 2.0 wt.-%.

The solution or suspension may be an aqueous solution or suspension, or an organic solution or suspension. Alternatively the solution or suspension may comprise both, water and an organic solvent that is miscible with water in any ration, preferably the ratio of water:solvent is from 100:0.1 to 100:200, preferably from 100:1 to 100:150, more preferably from 100:5 to 100:120 and most preferably from 100:10 to 100:100, based on the weight of the water and the dry weight of the solvent. Possible organic solvents for the present invention are, for example, methanol, ethanol, ethylene glycol, glycerol, acetone, or propanol.

According to a preferred embodiment the solution or suspension is an aqueous solution or suspension that comprises, preferably consists of water and the titanium comprising substance.

Process Steps d) and e)

According to step d) of the process of the present invention, the calcium carbonate-comprising material of step a) is treated with the calcium phosphate of step b) in an aqueous medium to form an aqueous suspension.

According to step e) the aqueous suspension of step d) is ground at a pH value of at least 4.2 to form an aqueous suspension of a white UV-absorbing surface-reacted calcium carbonate doped with a titanium species.

The at least one titanium comprising substance of step c) is added before and/or during and/or after step d) and/or before and/or during step e).

Unless indicated otherwise, the following explanations and embodiments also apply to the in-situ process for producing a white UV-absorbing surface-reacted calcium carbonate doped with a titanium species comprising steps a), B), c), D) and e), as defined above, in which dicalcium phosphate is formed in-situ. The skilled person will understand that in said case, process step B) corresponds to process step b), and process step D) corresponds to process step d).

According to step d) of the process of the present invention, the calcium carbonate-comprising material of step a) is treated with the calcium phosphate of step b) in an aqueous medium to form an aqueous suspension.

In case of the in situ process in step D) the calcium carbonate-comprising material of step a) is treated with the phosphate ion source of step B) in an aqueous medium to form an aqueous suspension comprising dicalcium phosphate.

The treatment step d) or D) is preferably preformed under mixing conditions. Suitable mixing methods are known to the skilled person. Examples of suitable mixing methods are shaking, mixing, stirring, agitating, ultrasonication, or inducing a turbulent or laminar flow by means such as baffles or lamellae. Suitable mixing equipment is known to the skilled person, and may be selected, for example, from stirrers, such as rotor stator systems, blade stirrers, propeller stirrers, turbine stirrers, or anchor stirrers, static mixers such as pipes including baffles or lamellae. According to an exemplary embodiment of the present invention, a rotor stator stirrer system is used. The skilled person will adapt the mixing conditions such as the mixing speed and temperature according to his process equipment.

The treatment step d) or D) may be carried out for at least 1 min, preferably for at least 5 min, more preferably for at least 10 min, and most preferably for at least 15 min.

The calcium carbonate-comprising material of step a) can be treated with the calcium phosphate of step b) by providing an aqueous suspension of the calcium carbonate-comprising material and adding the calcium phosphate of step b). The calcium phosphate of step b) can be added to the suspension as a concentrated solution or a more diluted solution. As an alternative, it is also possible to treat the calcium carbonate-comprising material with the calcium phosphate of step b) by adding the calcium carbonate-comprising material to a solution of the calcium phosphate of step b).

In case of the in-situ process, the calcium carbonate-comprising material of step a) can be treated with the phosphate ion source of step B) by providing an aqueous suspension of the calcium carbonate-comprising material and adding the phosphate ion source of step B). The phosphate ion source of step B) can be added to the suspension as a concentrated solution or a more diluted solution. As an alternative, it is also possible to treat the calcium carbonate-comprising material with the phosphate ion source of step B) by adding the calcium carbonate-comprising material to a solution of the phosphate ion source of step B).

According to one embodiment, the starting materials, i.e. the calcium carbonate-comprising material of step a) and the calcium phosphate of step b), are at room temperature, i.e. they have a temperature of 20° C.±2° C. The starting materials may be mixed in any order. According to one embodiment, step d) comprises the steps of:

d1) mixing the calcium carbonate-comprising material of step a) with water, and d2) mixing the calcium phosphate of step b) with the mixture of step d1).

According to another embodiment, step d) comprises the steps of:

d1') mixing the calcium phosphate of step b) with water, and d2') mixing the calcium carbonate-comprising material of step a) with the mixture of step d1'.

According to still another embodiment, the calcium carbonate-comprising material of step a), the calcium phosphate of step b), and water are mixed simultaneously.

According to another embodiment, the starting materials, i.e. the calcium carbonate-comprising material of step a) and the phosphate ion source of step B), exhibit room temperature, i.e. they have a temperature of 20° C.±2° C. The starting materials may be mixed in any order. According to one embodiment, step D) comprises the steps of:

D1) mixing the calcium carbonate-comprising material of step a) with water, and

D2) mixing the phosphate ion source of step B) with the mixture of step D1).

According to another embodiment, step D) comprises the steps of:

D1') mixing the phosphate ion source of step B) with water, and

D2') mixing the calcium carbonate-comprising material of step a) with the mixture of step D1'.

According to still another embodiment, the calcium carbonate-comprising material of step a), the phosphate ion source of step B), and water are mixed simultaneously.

Depending on the amount of water that is introduced during process steps a) and b) or B) additional water may be introduced during process step d) or D), for example, in order to control and/or maintain and/or achieve the desired solids content or Brookfield viscosity of the obtained aqueous suspension. According to one embodiment, the aqueous suspension formed in step d) or D) has a solids content from 1 to 95 wt.-%, based on the total weight of the aqueous suspension, preferably from 3 to 75 wt.-%, more preferably from 5 to 50 wt.-%, even more preferably from 7 to 30 wt.-%, still more preferably 9 to 25 wt.-%, and most preferably from 10 to 20 wt.-%. The Brookfield viscosity of the obtained aqueous suspension may be from 10 to 10 000 mPa·s, preferably from 50 to 5 000 mPa·s, more preferably from 100 to 1000 mPa·s, and most preferably 200 to 800 mPa·s.

According to one embodiment of the present invention, in step d) the pH value of the obtained aqueous suspension is at least 4.2, preferably from 4.5 to 14, more preferably from 4.7 to 13.5, more preferably from 5 to 13, even more preferably from 5.5 to 12.5, and most preferably from 6 to 12 and most preferably at a pH value from 6.0 to 8.0.

According to one embodiment of the present invention, step d) is carried out at a temperature from 10 to 100° C., preferably from 15 to 80° C., more preferably from 20 to 50° C., and most preferably at 20±2° C.

The process of step d) or D) may be carried out in form of a continuous process or a batch process, preferably in the form of a batch process.

The at least one titanium comprising substance of step c) is added before and/or during and/or after step d) and/or before and/or during step e).

According to a preferred embodiment of the present invention the at least one titanium comprising substance of step c) is added before and/or during and/or after step d) but before step e) and most preferably, the at least one titanium comprising substance of step c) is added during step d).

In case the at least one titanium comprising substance of step c) is added after step d) the calcium phosphate selected from monocalcium phosphate and/or dicalcium phosphate of step b) is still present in the solution. In case the at least one titanium comprising substance of step c) is added before and/or during step d) the at least one titanium comprising substance of step c) is still present in the solution when the calcium phosphate selected from monocalcium phosphate and/or dicalcium phosphate of step b) is added.

Alternatively, the at least one titanium comprising substance of step c) is added before and/or during and/or after step D) and/or before and/or during step e) in case of the in-situ process.

According to a preferred embodiment of the present invention the at least one titanium comprising substance of step c) is added before and/or during and/or after step D) but before step e) and most preferably, the at least one titanium comprising substance of step c) is added during step D) in case of the in situ process.

In case the at least one titanium comprising substance of step c) is added after step D) the dicalcium phosphate obtained in step D) is still present in the solution. In case the at least one titanium comprising substance of step c) is added before and/or during step D) the at least one titanium comprising substance of step c) is still present in the solution when the dicalcium phosphate is formed in step D).

During the inventive process the calcium phosphate selected from monocalcium phosphate and/or dicalcium phosphate of step b) or the dicalcium phosphate formed in step D) and the at least one titanium comprising substance are simultaneously present in the composition comprising the calcium carbonate comprising material and/or the surface-reacted calcium carbonate. Without wishing to be bound by theory the inventors are of the opinion that the simultaneous presence of the calcium phosphate selected from monocalcium phosphate and/or dicalcium phosphate and the at least one titanium comprising substance results in the doping of the surface-reacted calcium carbonate with a titanium species. Therefore, this process differs from mixing a surface-reacted calcium carbonate that has already been formed with at least one titanium comprising substance without the presence of calcium phosphate selected from monocalcium phosphate and/or dicalcium phosphate, which results in a mere mixing, even in an aqueous suspension, and will not lead to a doped material.

According to one embodiment of the present invention in a first step the calcium phosphate selected from monocalcium phosphate and/or dicalcium phosphate of step b) is added to the calcium carbonate comprising material of step a) and afterwards the titanium comprising substance of step c) is added.

According to another embodiment of the present invention in a first step the titanium comprising substance of step c) is added to the calcium carbonate comprising material of step a) and afterwards the calcium phosphate selected from monocalcium phosphate and/or dicalcium phosphate of step b) is added.

According to another embodiment of the present invention the titanium comprising substance of step c) is added to the calcium carbonate comprising material of step a) together with the calcium phosphate selected from mono-calcium phosphate and/or dicalcium phosphate of step b).

According to one embodiment of the present invention in a first step the phosphate ion source selected from phosphoric acid, a salt thereof, or a mixture thereof of step B) is added to the calcium carbonate comprising material of step a) and afterwards the titanium comprising substance of step c) is added.

According to another embodiment of the present invention in a first step the titanium comprising substance of step c) is added to the calcium carbonate comprising material of step a) and afterwards the phosphate ion source selected from phosphoric acid, a salt thereof, or a mixture thereof of step B) is added.

According to another embodiment of the present invention the titanium comprising substance of step c) is added to the calcium carbonate comprising material of step a) together with the phosphate ion source selected from phosphoric acid, a salt thereof, or a mixture thereof of step B).

According to one embodiment of the present invention the calcium phosphate selected from monocalcium phosphate and/or dicalcium phosphate of step b) or the phosphate ion source selected from phosphoric acid, a salt thereof, or a mixture thereof of step B) and/or the at least one titanium comprising substance of step c) are added in form of a solid or in form of a solution. Preferably, the calcium phosphate selected from monocalcium phosphate and/or dicalcium phosphate of step b) or the phosphate ion source selected from phosphoric acid, a salt thereof, or a mixture thereof of step B) and/or the at least one titanium comprising substance of step c) are added in form of a solution. More preferably, the calcium phosphate selected from monocalcium phosphate and/or dicalcium phosphate of step b) or the phosphate ion source selected from phosphoric acid, a salt thereof, or a mixture thereof of step B) and the at least one titanium comprising substance of step c) are added both in form of a solution.

The calcium phosphate selected from monocalcium phosphate and/or dicalcium phosphate of step b) or the phosphate ion source selected from phosphoric acid, a salt thereof, or a mixture thereof of step B) and the at least one titanium comprising substance of step c) may be provided in form of separate solutions and/or in form of combined solutions. According to one embodiment, in step d) or D) the calcium carbonate-comprising material is treated with a solution comprising the calcium phosphate selected from monocalcium phosphate and/or dicalcium phosphate of step b) or the phosphate ion source selected from phosphoric acid, a salt thereof, or a mixture thereof of step B) and the at least one titanium comprising substance of step c).

The compounds of step a) and/or b) or B) and/or c) may be added in one portion or in several portions. According to one embodiment each of the compounds can be added individually with a first solution or part comprising a first part of the compound and subsequently, with a second solution or part comprising the remaining part of the compound. The first solution or part may comprise less than or equal to 50 wt.-% of the compound, based on the total amount of the compound, preferably less than or equal to 40 wt.-%, more preferably less than or equal to 30 wt.-%, and most preferably less than or equal to 20 wt.-%. For example, the first solution or part may comprise from 0.1 to 50 wt.-% of the compound, based on the total amount of the compound, preferably from 1 to 40 wt.-%, more preferably from 5 to 30 wt.-%, and most preferably from 10 to 20 wt.-%.

According to process step e) of the process of the present invention, the aqueous suspension of step d) is ground at a pH value of at least 4.2 to form an aqueous suspension of a white UV-absorbing surface-reacted calcium carbonate doped with a titanium species.

In general, the process step e) can be carried out with any conventional grinding device, for example, under conditions such that refinement predominantly results from impacts with a secondary body, e.g. in one or more of: a ball mill, a rod mill, a vibrating mill, a sand mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. The grinding step e) may be also performed under conditions such that autogenous grinding takes place and/or by horizontal and or vertical ball milling, and/or other such processes known to the skilled man.

According to one embodiment, step e) is carried out in a ball mill, a rod mill, a vibrating mill, a centrifugal impact mill, a vertical bead mill, an attrition mill, a sand mill, or combinations thereof. Preferably, the grinding step e) may be carried out in a ball mill.

It has to be noted that process step e) may be carried out in at least one grinding device, i.e. it is also possible to use a series of grinding devices.

According to one embodiment, process step e) is carried out in one grinding device. According to another embodiment, process step e) is carried out in a series of grinding devices, preferably in a series of two, three, four or five grinding devices. According to one embodiment, process step e) is carried out in a series of grinding devices, wherein additional calcium phosphate selected from monocalcium phosphate and/or dicalcium phosphate is added after the first grinding device and before at least one of the subsequent grinding devices of the series of grinding devices. For example, process step e) is carried out in a series of two grinding devices and additional calcium phosphate selected from monocalcium phosphate and/or dicalcium phosphate is added after the first grinding device and before the second grinding device. According to another example, process step e) is carried out in a series of three grinding devices and additional calcium phosphate selected from monocalcium phosphate and/or dicalcium phosphate is added after the first grinding device and before the second grinding device and after the second grinding device and before the third grinding device.

It is a requirement of the inventive process that step e) is carried out at a pH of at least 4.2 in order to ensure that calcium salt excluding monocalcium phosphate and dicalcium phosphate and the calcium phosphate selected from monocalcium phosphate and/or dicalcium phosphate are converted into surface-reacted calcium salt particles during process step e). According to one embodiment, process step e) is carried out at a pH value from 4.5 to 14, preferably from 4.7 to 13.5, more preferably from 5 to 13, even more preferably from 5.5 to 12.5, and most preferably from 6 to 12 and most preferably at a pH value from 6.0 to 8.0. If necessary, the pH of the aqueous suspension obtained in step d) and or D) may be adjusted by all means known in the art. According to one embodiment, the pH of the aqueous suspension obtained in step d) or D) is adjusted to a pH value of at least 4.2 by the addition of potassium hydroxide, sodium hydroxide, ammonium hydroxide, or mixtures thereof.

Depending on the amount of water that is introduced during process steps a), b) or B), c) and d) or D) additional water may be introduced during process step e), for example, in order to control and/or maintain and/or achieve the desired solids content or Brookfield viscosity of the obtained aqueous suspension. According to one embodiment, process step e) is carried out at a solids content from 1 to 95 wt.-%, based on the total weight of the aqueous suspension, preferably from 3 to 75 wt.-%, more preferably from 5 to 50 wt.-%, even more preferably from 7 to 30 wt.-%, still more preferably 9 to 25 wt.-%, and most preferably from 10 to 20 wt.-%. The Brookfield viscosity of the aqueous suspension may be from 10 to 10 000 mPa·s, preferably from 50 to 5 000 mPa·s, more preferably from 100 to 1000 mPa's, and most preferably 200 to 800 mPa·s.

The process step e) may be carried out at room temperature, i.e. at 20° C.±2° C., or at other temperatures. According to one embodiment of the present invention, step e) is carried out at a temperature from 10 to 100° C., preferably from 15 to 80° C., more preferably from 20 to 50° C., and most preferably at 20° C.±2° C. Heat may be introduced by internal shear or by an external source or a combination thereof. If necessary, step e) may be carried out under cooling conditions using methods and equipment known in the art.

According to one embodiment of the present invention, step e) is carried out at a starting temperature from 0 to 110° C., preferably from 10 to 100° C., more preferably from 15 to 80° C., more preferably from 20 to 50° C., and most preferably at 20° C.±2° C.

In case the inventive process is carried out as an in-situ process comprising steps a), B), c), D), and e) as defined above, step e) is preferably carried out at temperature from 0 to 35° C., more preferably from 5 to 30° C., and most preferably from 10 to 25° C. According to one embodiment, in the in-situ process comprising steps a), B), c), D), and e) as defined above, step e) is carried out at a starting temperature from 0 to 35° C., preferably from 5 to 30° C., and most preferably from 10 to 25° C.

According to one embodiment, step e) is carried out for a period of time in the range from 10 sec to 5 hours, preferably from 30 sec to 2 hours, more preferably from 1 min to 60 min, even more preferably from 5 to 40 min, and most preferably from 10 min to 30 min.

The process step e) may be carried out at any suitable specific grinding energy (SGE), determined through first recording simultaneously the electrical power consumption (P) of the grinding device, given in KW, and the volumetric flow rate (vs) of the feeding slurry, given in m³/h, and as indicated in the respective monitoring displays. Further, the total solids (TS) content of the feeding slurry, given in wt.-% was determined using a Moisture Analyzer HR73 from Mettler-Toledo (T=120° C., automatic switch off 3, standard drying) with a sample size of 5 to 20 g. Assuming the density of water ($\rho_w$) to be 1.00 T/m³ and the density of the applied dry calcium carbonate/marble/chalk ($\rho_c$) to be 2.71 T/m³, the SGE can be calculated as the function of the given quantities, as expressed in equations (1), (2) and (3).

$$SGE = P / ((TS) \cdot m_s) \qquad \text{Eq. (1)}$$

$$m_s = \rho_s \cdot v_s \qquad \text{Eq. (2)}$$

$$\rho_s = [\rho_c \cdot \rho_w]/[\rho_c \cdot (1 - (TS)) + \rho_w \cdot (TS)] \qquad \text{Eq. (3)}$$

According to one embodiment, step e) is carried out at a specific grinding energy from 50 to 500 KWh per dry metric tonne of end product, preferably from 70 to 450 kWh per dry metric tonne of end product, more preferably from 150 to 350 kWh per dry metric tonne of end product, and most preferably from 200 to 300 KWh per dry metric tonne of end product.

According to one embodiment, the process step e) is carried out until the fraction of surface-reacted calcium salt particles having a particle size of less than 4 µm is greater than 10 vol.-%, preferably greater than 20 vol.-%, more preferably greater than 30 vol.-%, and most preferably greater than 50 vol.-%, based on the total volume of the surface-reacted calcium salt particles.

According to one embodiment of the present invention, the process step e) can be carried out in form of a batch process, a semi-continuous process, or a continuous process. According to a preferred embodiment of the present invention process step e) is carried out in form of a continuous process.

According to a preferred embodiment, the calcium carbonate-comprising material is a natural ground calcium carbonate, the calcium phosphate is dicalcium phosphate, and the at least one titanium comprising substance is selected from the group consisting of a titanium salt, a titanium hydroxide, a titanium oxide, and mixtures thereof, preferably the titanium comprising substance is selected from the group consisting of titanium bromide, titanium fluoride, titanium iodide, titanium chloride, titanyl sulfate, titanium hydroxide, titanium dioxide, and mixtures thereof and most preferably the titanium comprising substance is selected from titanium bromide, titanium fluoride, titanium iodide, titanium chloride, titanyl sulfate and mixtures thereof and most preferably titanyl sulfate.

According to another preferred embodiment, the calcium carbonate-comprising material is a natural ground calcium carbonate, the calcium phosphate is dicalcium phosphate, and the at least one titanium comprising substance is selected from the group consisting of a titanium salt, a titanium hydroxide, a titanium oxide, and mixtures thereof, preferably the titanium comprising substance is selected from the group consisting of titanium bromide, titanium fluoride, titanium iodide, titanium chloride, titanyl sulfate, titanium hydroxide, titanium dioxide, and mixtures thereof and most preferably the titanium comprising substance is selected from titanium bromide, titanium fluoride, titanium iodide, titanium chloride, titanyl sulfate and mixtures thereof and the at least one titanium comprising substance is added during and/or after step d) and before step e).

Preferably the calcium carbonate-comprising material is provided in form of an aqueous suspension having a solids content within the range from 1 to 90 wt.-%, preferably from 3 to 60 wt.-%, more preferably from 5 to 40 wt.-%, and most preferably from 10 to 25 wt.-%, based on the total weight of the aqueous suspension, and/or the calcium carbonate-comprising material is in form of particles having a weight median particle size $d_{50}$ (wt) from 0.05 to 500 μm, preferably from 0.2 to 200 μm, more preferably from 0.4 to 100 μm, and most preferably from 0.6 to 40 μm and/or a weight top cut particle size $d_{98}$ (wt) from 0.15 to 1500 μm, preferably from 1 to 600 μm, more preferably from 1.5 to 300 μm, and most preferably from 2 to 80 μm.

Preferably the calcium phosphate selected from monocalcium phosphate and/or dicalcium phosphate of step b) or the phosphate ion source selected from phosphoric acid, a salt thereof, or a mixture thereof of step B) is provided in form of an aqueous suspension having a solids content within the range from 1 to 90 wt.-%, preferably from 3 to 60 wt.-%, more preferably from 5 to 40 wt.-%, and most preferably from 10 to 25 wt.-%, based on the total weight of the aqueous suspension, and/or the calcium phosphate of step b) is in form of particles having a weight median particle size $d_{50}$ (wt) from 0.05 to 500 μm, preferably from 0.2 to 200 μm, more preferably from 0.4 to 100 μm, and most preferably from 0.6 to 40 μm.

Additionally or alternatively, the calcium carbonate-comprising material is treated with a solution comprising the at least one titanium comprising substance in an amount from 0.01 to 10 wt.-% titanium element, preferably in an amount from 0.1 to 8 wt.-%, more preferably in an amount from 0.4 to 5 wt.-%, and most preferably in an amount from 0.8 to 2 wt.-%, based on the total weight of the aqueous solution.

In a further embodiment of the preparation of the surface-reacted natural or precipitated calcium carbonate, the inventive process is performed in the presence of at least one compound selected from the group consisting of silicate, aluminium hydroxide, earth alkali aluminate such as sodium or potassium aluminate, magnesium oxide, or mixtures thereof. Preferably, the at least one silicate is selected from an aluminium silicate, a calcium silicate, or an earth alkali metal silicate. These components can be added to an aqueous suspension comprising the natural or precipitated calcium carbonate before adding the calcium phosphate selected from monocalcium phosphate and/or dicalcium phosphate of step b) or the phosphate ion source selected from phosphoric acid, a salt thereof, or a mixture thereof of step B).

Alternatively, the silicate and/or aluminium hydroxide and/or earth alkali aluminate and/or magnesium oxide component(s) can be added to the aqueous suspension of natural or precipitated calcium carbonate while the reaction of natural or precipitated calcium carbonate with the calcium phosphate selected from monocalcium phosphate and/or dicalcium phosphate of step b) or the phosphate ion source selected from phosphoric acid, a salt thereof, or a mixture thereof of step B) has already started. Further details about the preparation of the surface-reacted natural or precipitated calcium carbonate in the presence of at least one silicate and/or aluminium hydroxide and/or earth alkali aluminate component(s) are disclosed in WO 2004/083316 A1, the content of this reference herewith being included in the present application.

The process of the present invention can be carried out in form of a batch process, a semi-continuous process, or a continuous process. Process steps d) and/or e) may be repeated one or several times, if appropriate.

In a batch process, a vessel may be provided, in which the calcium carbonate-comprising material of step a) and the calcium phosphate of step b) are mixed with water to form an aqueous suspension in accordance with process step d). Subsequently, the aqueous suspension obtained in step d) is transferred to a grinding device, wherein the aqueous suspension is ground at a pH value of at least 4.2 to form an aqueous suspension of a white UV-absorbing surface-reacted calcium carbonate doped with a titanium species particles. The at least one titanium comprising substance of step c) is added before and/or during and/or after step d) and/or before and/or during step e).

According to one exemplary batch process, a first vessel including a mixing device, a second vessel including a mixing device, and a third vessel are provided. In a first step, the calcium carbonate-comprising material of step a) and water are mixed in the first vessel. Subsequently, the obtained mixture is transferred to the second vessel, wherein the calcium phosphate of step b) is added. The obtained aqueous suspension is stored in a third vessel, from which it is transferred to a grinding device, wherein the aqueous suspension is ground at a pH value of at least 4.2 to form an aqueous suspension of surface-reacted calcium salt particles. It may be preferable to equip the third vessel with a low-speed mixer in order to mix the aqueous suspension for a prolonged time, for example, for several days. The at least one titanium comprising substance may be added to the first and/or the second and/or the third vessel before and or during the grinding step.

In a continuous process, a vessel and a grinding device may be provided. The calcium carbonate-comprising material of step a), the calcium phosphate of step b), and water may be fed to the vessel separately or together, wherein calcium carbonate-comprising material step a), the calcium phosphate of step b), and water are mixed, and the formed aqueous suspension is continuously transferred to the grinding device. In the grinding device the aqueous suspension is ground at a pH value of at least 4.2 to form an aqueous suspension of surface-reacted calcium salt particles, which is continuously discharged from the grinding unit. The at least one titanium comprising substance of step c) is added before and/or during and/or after step d) and/or before and/or during step e).

By the process of the present invention it is possible to produce a white UV-absorbing surface-reacted calcium carbonate doped with a titanium species. The white UV-absorbing surface-reacted calcium carbonate doped with a titanium species particles obtained by the process of the present invention may have a volume determined median particle size $d_{50}$ (vol) from 0.5 to 75 μm, preferably from 1 to 50 μm, more preferably from 2 to 40 μm, even more preferably from 2.5 to 30 μm, and most preferably from 3 to 15 μm. Additionally or alternatively, the surface-reacted calcium salt particles obtained by the process of the present invention may have a volume determined top cut particle size des (vol) from 1 to 150 μm, preferably from 2 to 100 μm, more preferably from 4 to 80 μm, even more preferably from 5 to 60 μm, and most preferably from 6 to 30 μm.

The inventors surprisingly found that the co-grinding of a calcium phosphate selected from monocalcium phosphate and/or dicalcium phosphate with a calcium carbonate-comprising material at a pH of at least 4.2 and the addition of at least one titanium comprising substance before and/or during and/or after step d) and/or before and/or during step e) results in the formation of surface-reacted calcium salt particles with small particle size and high specific surface areas that are doped with a titanium species. Without being bound to any theory, the inventors believe that the grinding step of the inventive process provides the benefit that the (chemical) reaction speed of the inventive process is increased by continuously producing a freshly prepared and hence reactive surface of starting materials. In addition, the inventors found that the inventive process can utilize coarse starting materials as well as starting materials, which have a lower quality, e.g. in that they contain certain impurities. This provides the possibility to utilize materials such as by-products of other processes or waste-materials, which are difficult to use in conventional processes for producing surface-reacted calcium salt particles.

Furthermore, it was found by the inventors of the present invention that the energy introduced by the grinding step can be sufficient to induce the conversion into surface-reacted calcium salt particles. This provides the possibility to operate the process at low temperatures and/or with starting materials having room temperature, i.e. a temperature of 20° C.±2° C., and hence, decreases production costs. Another advantage of the inventive process is that it can be carried out with standard milling equipment and can be carried out as a continuous process, which facilitates the production of surface-reacted calcium salt particles. Moreover, the inventive process does not require the addition of external carbon dioxide.

Additionally, the inventors surprisingly found out that by the described inventive process it is possible to prepare surface-reacted calcium carbonate particles that are doped with a titanium species. The process for producing these particles is an easy and quick process and the obtained product is affordable and especially easy to handle. The process can be performed in standard equipment without significant burden for humans and environment. Such a process and product is advantageous since the end consumer has not to handle particles that comprise titanium dioxide in form of powders comprising submicrometer or nanometer size titanium dioxide particles. Therefore, dusting can be reduced or eliminated, which may occur when both compounds, surface-reacted calcium carbonate and titanium dioxide, are mixed in form of dry products, which may cause health issues, especially when inhaled. Furthermore, the particles separation during transport can be reduced or eliminated, which may occur when both compounds, surface-reacted calcium carbonate and a titanium containing material (e.g. titanium dioxide), are mixed in form of dry products.

According to another preferred embodiment, the calcium carbonate-comprising material is a natural ground calcium carbonate, the phosphate ion source is selected from phosphoric acid, a salt thereof, or a mixture thereof of step B) and is provided in form of an aqueous suspension having a solids content within the range from 1 to 90 wt.-%, preferably from 3 to 60 wt.-%, more preferably from 5 to 40 wt.-%, and most preferably from 10 to 25 wt.-%, based on the total weight of the aqueous suspension, and the at least one titanium comprising substance is selected from the group consisting of a titanium salt, a titanium hydroxide, a titanium oxide, and mixtures thereof, preferably the titanium comprising substance is selected from the group consisting of titanium bromide, titanium fluoride, titanium iodide, titanium chloride, titanyl sulfate, titanium hydroxide, titanium dioxide, and mixtures thereof and most preferably the titanium comprising substance is selected from titanium bromide, titanium fluoride, titanium iodide, titanium chloride, titanyl sulfate and mixtures thereof and most preferably the titanium comprising substance is titanyl sulfate and is added during and/or after step d) and before step e). Preferably, the calcium carbonate-comprising material is treated with a solution comprising the at least one titanium comprising substance in an amount from 0.01 to 10 wt.-% titanium element, preferably in an amount from 0.1 to 8 wt.-%, more preferably in an amount from 0.4 to 5 wt.-%, and most preferably in an amount from 0.8 to 2 wt.-%, based on the total weight of the aqueous solution.

Additional Process Steps

According to one embodiment, the process of the present invention further comprises a step of agitating the aqueous suspension after step e). Preferably, the suspension is agitated for at least 1 min, preferably for at least 5 min, more preferably for at least 10 min, and most preferably for at least 15 min.

According to another embodiment the white UV-absorbing surface-reacted calcium carbonate doped with a titanium species can be kept in suspension and can be optionally further stabilized by a dispersant. Conventional dispersants known to the skilled person can be used. A preferred dispersant is comprised of polyacrylic acids and/or carboxymethylcelluloses. However, also other dispersant are possible. The skilled person will choose the dispersant dependent on his equipment and the intended use of the white UV-absorbing surface-reacted calcium carbonate doped with a titanium species. According to a preferred embodiment, the white UV-absorbing surface-reacted calcium carbonate doped with a titanium species is separated from the aqueous suspension, for example by filtration, and afterwards a dispersant is added to the filter cake, preferably in form of a solution or dispersion. The skilled person knows how to filter and redispersed the white UV-absorbing surface-reacted calcium carbonate doped with a titanium species and will chose the dispersant and separation method dependent on his equipment and the intended use.

According to a further, optional embodiment, the solids content of the aqueous suspension obtained by the process according to the present invention can be adjusted. For example, water may be added to the suspension until the desired solids content is obtained. Additionally or alternatively, a suspension having an appropriate lower content of solid particles may be added to the aqueous suspension of white UV-absorbing surface-reacted calcium carbonate doped with a titanium species particles until the desired solid content is obtained. Alternatively, the suspension may be partially dewatered by a filtration process such as nanofiltration or a thermal separation process such as an evaporation process.

According to one optional embodiment, the process according to the present invention further comprises the step of adjusting the solids content of the aqueous suspension of white UV-absorbing surface-reacted calcium carbonate doped with a titanium species particles formed in step e). According to one embodiment of the present invention, the solids content of the aqueous suspension of white UV-absorbing surface-reacted calcium carbonate doped with a titanium species particles formed in step e) is adjusted so that it is from 20 to 60 wt.-%, preferably from 25 to 50 wt.-%, and more preferably from 30 to 45 wt.-%, based on the total weight of the suspension.

The aqueous suspension obtained after step e) may be further processed, e.g., the white UV-absorbing surface-reacted calcium carbonate doped with a titanium species may be separated from the aqueous suspension and/or subjected to a drying step.

According to one embodiment, the process of the present invention further comprises a step f) of separating the white UV-absorbing surface-reacted calcium carbonate doped with a titanium species from the aqueous suspension obtained in step e). Thus, a process for manufacturing a white UV-absorbing surface-reacted calcium carbonate doped with a titanium species may comprise the following steps:

a) providing a calcium carbonate-comprising material,
    b) providing a calcium phosphate selected from mono-calcium phosphate and/or dicalcium phosphate,
    c) providing at least one titanium comprising substance, and
    d) treating the calcium carbonate-comprising material of step a) with the calcium phosphate of step b) in an aqueous medium to form an aqueous suspension and
    e) grinding the aqueous suspension of step d) at a pH value of at least 4.2 to form an aqueous suspension of a white UV-absorbing surface-reacted calcium carbonate doped with a titanium species,
    wherein the calcium carbonate-comprising material of step a) and the calcium phosphate of step b) in combination have a calcium ion to phosphate ion molar ratio ($Ca^{2+}$:$PO_4^{3-}$) in the range from 1.75:1 to 100:1, and
    wherein the at least one titanium comprising substance of step c) is added before and/or during and/or after step d) and/or before and/or during step e), and
    f) separating the white UV-absorbing surface-reacted calcium carbonate doped with a titanium species from the aqueous suspension obtained from step e).

Alternatively, the process for manufacturing a white UV-absorbing surface-reacted calcium carbonate doped with a titanium species may comprise the following steps:

a) providing a calcium carbonate-comprising material,
    B) providing a phosphate ion source selected from phosphoric acid, a salt thereof, or a mixture thereof,
    c) providing at least one titanium comprising substance,
    D) treating the calcium carbonate-comprising material of step a) with the phosphate ion source of step B) in an aqueous medium to form an aqueous suspension comprising dicalcium phosphate, and
    e) grinding the aqueous suspension of step D) at a pH value of at least 4.2 to form an aqueous suspension of a white UV-absorbing surface-reacted calcium carbonate doped with a titanium species,
    wherein the calcium carbonate-comprising material of step a) and the phosphate ion source of step B) in combination have a calcium ion to phosphate ion molar ratio ($Ca^{2+}$:$PO_4^{3-}$) in the range from 1.75:1 to 100:1, and
    wherein the at least one titanium comprising substance of step c) is added before and/or during and/or after step D) and/or before and/or during step e) and
    f) separating the white UV-absorbing surface-reacted calcium carbonate doped with a titanium species from the aqueous suspension obtained from step e).

The white UV-absorbing surface-reacted calcium carbonate doped with a titanium species obtained from step e) may be separated from the aqueous suspension by any conventional means of separation known to the skilled person. According to one embodiment of the present invention, in process step f) the white UV-absorbing surface-reacted calcium carbonate doped with a titanium species is separated mechanically and/or thermally. Examples of mechanical separation processes are filtration, e.g. by means of a drum filter or filter press, nanofiltration, or centrifugation. An example for a thermal separation process is a concentrating process by the application of heat, for example, in an evaporator. According to a preferred embodiment, in process step f) the surface-reacted calcium carbonate is separated by solvent evaporation and/or pressure filtration.

After separation, the white UV-absorbing surface-reacted calcium carbonate doped with a titanium species can be dried in order to obtain a dried white UV-absorbing surface-reacted calcium carbonate doped with a titanium species. According to one embodiment, the process of the present invention further comprises a step g) of drying the white UV-absorbing surface-reacted calcium carbonate doped with a titanium species after step e) or after step f), if present, at a temperature in the range from 60 to 600° C., preferably from 80 to 450° C., most preferably from 95 to 400° C., preferably until the moisture content of the white UV-absorbing surface-reacted calcium carbonate doped with a titanium species is less than 1 wt.-%, based on the total weight of the dried white UV-absorbing surface-reacted calcium carbonate doped with a titanium species.

According to one embodiment, the process of the present invention further comprises a step g) of drying the white UV-absorbing surface-reacted calcium carbonate doped with a titanium species from the aqueous suspension obtained in step e) and/or step f). Thus, a process for manufacturing a white UV-absorbing surface-reacted calcium carbonate doped with a titanium species may comprise the following steps:

a) providing a calcium carbonate-comprising material,
    b) providing a calcium phosphate selected from mono-calcium phosphate and/or dicalcium phosphate,
    c) providing at least one titanium comprising substance, and d) treating the calcium carbonate-comprising material of step a) with the calcium phosphate of step b) in an aqueous medium to form an aqueous suspension and e) grinding the aqueous suspension of step d) at a pH value of at least 4.2 to form an aqueous suspension of a white UV-absorbing surface-reacted calcium carbonate doped with a titanium species, wherein the calcium carbonate-comprising material of step a) and the calcium phosphate of step b) in combination have a calcium ion to phosphate ion molar ratio ($Ca^{2+}:PO_4^{3-}$) in the range from 1.75:1 to 100:1, and wherein the at least one titanium comprising substance of step c) is added before and/or during and/or after step d) and/or before and/or during step e), f) separating the white UV-absorbing surface-reacted calcium carbonate doped with a titanium species from the aqueous suspension obtained from step e) and g) drying the white UV-absorbing surface-reacted calcium carbonate doped with a titanium species.

Alternatively, the process for manufacturing a white UV-absorbing surface-reacted calcium carbonate doped with a titanium species may comprise the following steps:

a) providing a calcium carbonate-comprising material,

B) providing a phosphate ion source selected from phosphoric acid, a salt thereof, or a mixture thereof, c) providing at least one titanium comprising substance, D) treating the calcium carbonate-comprising material of step a) with the phosphate ion source of step B) in an aqueous medium to form an aqueous suspension comprising dicalcium phosphate, and e) grinding the aqueous suspension of step D) at a pH value of at least 4.2 to form an aqueous suspension of a white UV-absorbing surface-reacted calcium carbonate doped with a titanium species, wherein the calcium carbonate-comprising material of step a) and the phosphate ion source of step B) in combination have a calcium ion to phosphate ion molar ratio ($Ca^{2+}:PO_4^{3-}$) in the range from 1.75:1 to 100:1, and wherein the at least one titanium comprising substance of step c) is added before and/or during and/or after step D) and/or before and/or during step e) and f) separating the white UV-absorbing surface-reacted calcium carbonate doped with a titanium species from the aqueous suspension obtained from step e) and g) drying the white UV-absorbing surface-reacted calcium carbonate doped with a titanium species.

In general, the drying step g) may take place using any suitable drying equipment and can, for example, include thermal drying and/or drying at reduced pressure using equipment such as an evaporator, a flash drier, an oven, a spray drier and/or drying in a vacuum chamber. The drying step g) can be carried out at reduced pressure, ambient pressure or under increased pressure. For temperatures below 100° C. it may be preferred to carry out the drying step under reduced pressure. The drying step can be performed, for example, for at least 30 seconds, for at least 1 minute, 2 minutes, 5 minutes, 10 minutes, 30 minutes, 1 hour, 2 hours, 12 hours or 1 day. The skilled person can choose the drying time dependent on the equipment, the water content and the intended use.

According to one preferred embodiment, the separation is carried out by a thermal method. This may allow to dry the white UV-absorbing surface-reacted calcium carbonate doped with a titanium species subsequently without changing the equipment.

According to one embodiment, in process step g) the white UV-absorbing surface-reacted calcium carbonate doped with a titanium species is dried until the moisture content of the white UV-absorbing surface-reacted calcium carbonate doped with a titanium species is less than or equal to 1.0 wt.-%, based on the total weight of the dried white UV-absorbing surface-reacted calcium carbonate doped with a titanium species, preferably less than or equal to 0.5 wt.-%, and more preferably less than or equal to 0.2 wt.-%.

According to another embodiment, the process of the present invention further comprises a step h) of treating the surface of the white UV-absorbing surface-reacted calcium carbonate doped with a titanium species from the aqueous suspension obtained in step e) and/or step f) and/or step g). Thus, a process for manufacturing a white UV-absorbing surface-reacted calcium carbonate doped with a titanium species may comprise the following steps:

a) providing a calcium carbonate-comprising material, b) providing a calcium phosphate selected from monocalcium phosphate and/or dicalcium phosphate, c) providing at least one titanium comprising substance, and d) treating the calcium carbonate-comprising material of step a) with the calcium phosphate of step b) in an aqueous medium to form an aqueous suspension and e) grinding the aqueous suspension of step d) at a pH value of at least 4.2 to form an aqueous suspension of a white UV-absorbing surface-reacted calcium carbonate doped with a titanium species, wherein the calcium carbonate-comprising material of step a) and the calcium phosphate of step b) in combination have a calcium ion to phosphate ion molar ratio ($Ca^{2+}:PO_4^{3-}$) in the range from 1.75:1 to 100:1, and wherein the at least one titanium comprising substance of step c) is added before and/or during and/or after step d) and/or before and/or during step e), f) separating the white UV-absorbing surface-reacted calcium carbonate doped with a titanium species from the aqueous suspension obtained from step e) and g) drying the white UV-absorbing surface-reacted calcium carbonate doped with a titanium species, and h) treating the surface of the obtained white UV-absorbing surface-reacted calcium carbonate doped with a titanium species.

Alternatively, the process for manufacturing a white UV-absorbing surface-reacted calcium carbonate doped with a titanium species may comprise the following steps:

a) providing a calcium carbonate-comprising material,

B) providing a phosphate ion source selected from phosphoric acid, a salt thereof, or a mixture thereof, c) providing at least one titanium comprising substance, D) treating the calcium carbonate-comprising material of step a) with the phosphate ion source of step B) in an aqueous medium to form an aqueous suspension comprising dicalcium phosphate, and e) grinding the aqueous suspension of step D) at a pH value of at least 4.2 to form an aqueous suspension of a white UV-absorbing surface-reacted calcium carbonate doped with a titanium species, wherein the calcium carbonate-comprising material of step a) and the phosphate ion source of step B) in combination have a calcium ion to phosphate ion molar ratio ($Ca^{2+}:PO_4^{3-}$) in the range from 1.75:1 to 100:1, and wherein the at least one titanium comprising substance of step c) is added before and/or during and/or after step D) and/or before and/or during step e) and f) separating the white UV-absorbing surface-reacted calcium carbonate doped with a titanium species from the aqueous suspension obtained from step e)

g) drying the white UV-absorbing surface-reacted calcium carbonate doped with a titanium species and h) treating the surface of the obtained white UV-absorbing surface-reacted calcium carbonate doped with a titanium species.

In general, the treatment step h) may take place using any suitable treatment agent, for example hydrophobic agents such as fatty acids. The treatment agent may, for example, be an aliphatic carboxylic acid having a total amount of carbon atoms from C4 to C24 and/or at least one mono-substituted succinic anhydride consisting of succinic anhydride mono-substituted with a group selected from a linear, branched, aliphatic and cyclic group having a total amount of carbon atoms from C2 to C30 in the substituent and/or a phosphoric acid ester blend of one or more phosphoric acid mono-ester and one or more phosphoric di-ester. Preferred hydrophobic agents are stearic acid and palmitic acid. Such treatment agents are known to the skilled person and are commercially available. The surface treatment of the white UV-absorbing surface-reacted calcium carbonate doped with a titanium species may affect the rheological properties of that material.

According to a preferred embodiment of the present invention, a process for producing a white UV-absorbing surface-reacted calcium carbonate doped with a titanium species is provided, comprising the steps of:

a) providing a calcium carbonate-comprising material, b) providing a calcium phosphate selected from mono-calcium phosphate and/or dicalcium phosphate, c) providing at least one titanium comprising substance, and d) treating the calcium carbonate-comprising material of step a) with the calcium phosphate of step b) in an aqueous medium to form an aqueous suspension and e) grinding the aqueous suspension of step d) at a pH value of at least 4.2 to form an aqueous suspension of a white UV-absorbing surface-reacted calcium carbonate doped with a titanium species, wherein the calcium carbonate-comprising material of step a) and the calcium phosphate of step b) in combination have a calcium ion to phosphate ion molar ratio ($Ca^{2+}:PO_4^{3-}$) in the range from 1.75:1 to 100:1, and wherein the at least one titanium comprising substance of step c) is added before and/or during and/or after step d) and/or before and/or during step e), wherein the dicalcium phosphate is produced by i) providing natural ground calcium carbonate, ii) providing phosphoric acid and iii) contacting the natural ground calcium carbonate of step i) and the phosphoric acid of step ii) in the presence of water to form dicalcium phosphate, wherein the natural ground calcium carbonate of step i) and the phosphoric acid of step ii) in combination are provided in a calcium ion to phosphate ion molar ratio from 1:2 to 5:1.

According to another preferred embodiment of the present invention, a process for producing a white UV-absorbing surface-reacted calcium carbonate doped with a titanium species is provided, comprising the steps of:

a) providing a calcium carbonate-comprising material,

B) providing a phosphate ion source selected from phosphoric acid, a salt thereof, or a mixture thereof, c) providing at least one titanium comprising substance, and D) treating the calcium carbonate-comprising material of step a) with the phosphate ion source of step B) in an aqueous medium to form an aqueous suspension comprising dicalcium phosphate and e) grinding the aqueous suspension of step d) at a pH value of at least 4.2 to form an aqueous suspension of a white UV-absorbing surface-reacted calcium carbonate doped with a titanium species, wherein the calcium carbonate-comprising material of step a) and the phosphate ion source of step B) in combination are provided in a calcium ion to phosphate ion molar ratio ($Ca^{2+}:PO_4^{3-}$) in the range from 1.75:1 to 100:1, and wherein the at least one titanium comprising substance of step c) is added before and/or during and/or after step d) and/or before and/or during step e).

According to another preferred embodiment of the present invention, a process for producing a white UV-absorbing surface-reacted calcium carbonate doped with a titanium species is provided, comprising the steps of:

a) providing a calcium carbonate-comprising material,

B) providing phosphoric acid, c) providing at least one titanium comprising substance, and D) treating the calcium carbonate-comprising material of step a) with the phosphoric acid of step B) in an aqueous medium to form an aqueous suspension comprising dicalcium phosphate and e) grinding the aqueous suspension of step d) at a pH value of at least 4.2 to form an aqueous suspension of a white UV-absorbing surface-reacted calcium carbonate doped with a titanium species, wherein the calcium carbonate-comprising material of step a) and the phosphoric acid of step B) in combination are provided in a calcium ion to phosphate ion molar ratio ($Ca^{2+}:PO_4^{3-}$) in the range from 1.75:1 to 100:1, and wherein the at least one titanium comprising substance of step c) is added before and/or during and/or after step d) and/or before and/or during step e).

The White UV-Absorbing Surface-Reacted Calcium Carbonate Doped with a Titanium Species According to a further aspect of the present invention, a white UV-absorbing surface-reacted calcium carbonate doped with a titanium species is provided. The white UV-absorbing surface-reacted calcium carbonate doped with a titanium species is obtainable by the inventive process.

More precisely, the white UV-absorbing surface-reacted calcium carbonate doped with a titanium species is obtainable by a process comprising the steps of:

a) providing a calcium carbonate-comprising material, b) providing a calcium phosphate selected from mono-calcium phosphate and/or dicalcium phosphate, c) providing at least one titanium comprising substance, and d) treating the calcium carbonate-comprising material of step a) with the calcium phosphate of step b) in an aqueous medium to form an aqueous suspension and e) grinding the aqueous suspension of step d) at a pH value of at least 4.2 to form an aqueous suspension of a white UV-absorbing surface-reacted calcium carbonate doped with a titanium species, wherein the calcium carbonate-comprising material of step a) and the calcium phosphate of step b) in combination have a calcium ion to phosphate ion molar ratio ($Ca^{2+}:PO_4^{3-}$) in the range from 1.75:1 to 100.1, and wherein the at least one titanium comprising substance of step c) is added before and/or during and/or after step d) and/or before and/or during step e).

According to another embodiment of the present invention, the white UV-absorbing surface-reacted calcium carbonate doped with a titanium species is obtainable by a process comprising the steps of:

a) providing a calcium carbonate-comprising material,

B) providing a phosphate ion source selected from phosphoric acid, a salt thereof, or a mixture thereof, c) providing at least one titanium comprising substance, D) treating the calcium carbonate-comprising material of step a) with the phosphate ion source of step B) in an aqueous medium to form an aqueous suspension comprising dicalcium phosphate, and e) grinding the aqueous suspension of step D) at a pH value of at least 4.2 to form an aqueous suspension of a white UV-absorbing surface-reacted calcium carbonate doped with a titanium species, wherein the calcium carbonate-comprising material of step a) and the phosphate ion source of step B) in combination have a calcium ion to phosphate ion molar ratio ($Ca^{2+}:PO_4^{3-}$) in the range from 1.75:1 to 100:1, and wherein the at least one titanium comprising substance of step c) is added before and/or during and/or after step D) and/or before and/or during step e).

The white UV-absorbing surface-reacted calcium carbonate doped with a titanium species obtained by the present invention may be present in a suspension or slurry or may be present as dry white UV-absorbing surface-reacted calcium carbonate doped with a titanium species.

According to one embodiment of the present invention, the white UV-absorbing surface-reacted calcium carbonate doped with a titanium species obtained by the inventive process comprises in addition to the calcium carbonate at least one water-insoluble calcium salt other than calcium carbonate, namely hydroxyapatite. "Hydroxyapatite" in the meaning of the present invention, also called hydroxylapatite (HA), is a naturally occurring mineral form of calcium apatite with the formula $Ca_5(PO_4)_3$ (OH). The hydroxyapatite may be further substituted with a carbonate ion and/or a halide ion such as fluoride, bromide, iodide, chloride ion or mixtures thereof instead of the hydroxy group.

In addition to the hydroxyapatite the white UV-absorbing surface-reacted calcium carbonate doped with a titanium species obtained by the inventive process may comprise further water-insoluble calcium salt other than calcium carbonate for example, tricalcium phosphate and/or apatitic calcium phosphate, preferably octacalcium phosphate, fluoroapatite, carboxyapatite, or mixtures thereof. The surface-reacted calcium salt particles may comprise a mass ratio of calcium carbonate to tricalcium phosphate and/or apatitic calcium phosphate is in the range from 0.05:1 to 59:1, preferably from 0.14:1 to 44:1, more preferably from 0.2:1 to 29:1, even more preferably from 0.3:1 to 15:1, and most preferably from 0.5:1 to 5:1.

According to another embodiment of the present invention, white UV-absorbing surface-reacted calcium carbonate doped with a titanium species obtained by the inventive process comprises calcite as calcium carbonate. "Calcite" in the meaning of the present invention is the most common crystal polymorph of calcium carbonate and is considered to be the most stable crystal form of calcium carbonate.

In addition to calcite, the white UV-absorbing surface-reacted calcium carbonate doped with a titanium species obtained by the inventive process may comprise further crystal structures such as, for example, aragonite and/or vaterite.

According to one embodiment of the present invention, the weight ratio of calcite to hydroxyapatite is from 99:1 to 1:99 based on the dry weight of the calcite and the dry weight of the hydroxyapatite. According to a preferred embodiment of the present invention, the weight ratio of calcite to hydroxyapatite is from 80:20 to 20:80 based on the dry weight of the calcite and the dry weight of the hydroxyapatite, more preferably from 70:30 to 30:70 and most preferably from 60:40 to 40:60.

According to a preferred embodiment of the present invention the white UV-absorbing surface-reacted calcium carbonate doped with a titanium species obtained by the inventive process comprises only calcite as a calcium carbonate crystal structure but no further calcium carbonate crystal structures.

The white UV-absorbing surface-reacted calcium carbonate is doped with a titanium species. "Doped" with a titanium species in the meaning of the present invention refers to the incorporation or introduction of a titanium species in the structure of the calcium carbonate. The doping of the surface-reacted calcium carbonate with a titanium species may be present only in an outer layer of the surface-reacted calcium carbonate or may be present within the whole surface-reacted calcium carbonate. The doping may be present even or uneven in the surface-reacted calcium carbonate. According to a preferred embodiment of the present invention the doping with the titanium species is present even within the whole surface-reacted calcium carbonate. "Doping" in the meaning of the present invention is different to a mere mixture of surface-reacted calcium carbonate with a titanium species or to a coating with the titanium species. The skilled person knows how to measure whether a structure is doped or merely mixed with a titanium species, for example by SEM, EDX or XPS measurements, but also UV-Vis measurements are suitable. For example, by SEM measurement, the skilled person knows how to distinguish between individual particles and attached particles.

The titanium species in the meaning of the present invention refers to titanium in oxidation numbers different to zero. According to one embodiment of the present invention, the titanium species in the meaning of the present invention refers to $Ti^{2+}$, $Ti^{3+}$ and/or $Ti^{4+}$, preferably $Ti^{3+}$ and/or $Ti^{4+}$, and most preferably $Ti^{4+}$.

The titanium species is present in an amount from 0.01 to 20 wt.-% of titanium element, based on the total dry weight of the surface-reacted calcium carbonate. According to a preferred embodiment of the present invention the titanium species is present in an amount from 0.05 to 15 wt.-% of titanium element, based on the total dry weight of the surface-reacted calcium carbonate, more preferably from 0.1 to 10 wt.-%, and most preferably from 0.5 to 5 wt.-%.

According to one embodiment of the present invention, the white UV-absorbing surface-reacted calcium carbonate doped with a titanium species obtained by the inventive process comprises particles having a specific surface area of from 5 $m^2/g$ to 200 $m^2/g$, measured using nitrogen and the BET method according to ISO 9277:2010, preferably from 10 $m^2/g$ to 180 $m^2/g$, more preferably from 20 $m^2/g$ to 170 $m^2/g$, even more preferably from 25 $m^2/g$ to 150 $m^2/g$, and most preferably from 30 $m^2/g$ to 100 $m^2/g$, measured using nitrogen and the BET method according to ISO 9277:2010. The BET specific surface area in the meaning of the present invention is defined as the surface area of the particles divided by the mass of the particles. As used therein the specific surface area is measured by adsorption using the BET isotherm (ISO 9277:2010) and is specified in $m^2/g$.

According to another embodiment of the present invention, the white UV-absorbing surface-reacted calcium carbonate doped with a titanium species obtained by the inventive process comprises particles having a specific surface area (BET) of from $5 \ m^2/g$ to $200 \ m^2/g$, preferably from $10 \ m^2/g$ to $180 \ m^2/g$, more preferably from $20 \ m^2/g$ to $170 \ m^2/g$, even more preferably from $25 \ m^2/g$ to $150 \ m^2/g$, and most preferably from $30 \ m^2/g$ to $100 \ m^2/g$, measured using nitrogen and the BET method, and the surface-reacted calcium carbonate particles comprise a mass ratio of calcium carbonate, preferably calcite, to hydroxylapatite, in the range from 99:1 to 1:99 based on the dry weight of the calcium carbonate, preferably calcite, and the dry weight of the hydroxyapatite, preferably the weight ratio of calcium carbonate, preferably calcite, to hydroxyapatite is from 80:20 to 20:80 based on the dry weight of the calcium carbonate, preferably calcite, and the dry weight of the hydroxyapatite, more preferably from 70:30 to 30:70 and most preferably from 60:40 to 40:60.

According to one embodiment, the white UV-absorbing surface-reacted calcium carbonate doped with a titanium species obtained by the process of the present invention has a volume determined median particle size $d_{50}$ (vol) from 0.5 to 75 μm, preferably from 1 to 50 μm, more preferably from 2 to 40 μm, even more preferably from 2.5 to 30 μm, and most preferably from 3 to 15 μm.

Additionally or alternatively, the white UV-absorbing surface-reacted calcium carbonate doped with a titanium species obtained by the process of the present invention has a volume determined top cut particle size $d_{98}$ (vol) from 1 to 150 μm, preferably from 2 to 100 μm, more preferably from 4 to 80 μm, even more preferably from 5 to 60 μm, and most preferably from 6 to 30 μm.

The value $d_x$ represents the diameter relative to which x % of the particles have diameters less than $d_x$. This means that the $d_{96}$ value is the particle size at which 98% of all particles are smaller. The des value is also designated as "top cut". The $d_x$ values may be given in volume or weight percent. The $d_{50}$ (wt) value is thus the weight median particle size, i.e. 50 wt.-% of all grains are smaller than this particle size, and the $d_{50}$ (vol) value is the volume median particle size, i.e. 50 vol.-% of all grains are smaller than this particle size.

Volume median grain diameter $d_{50}$ was evaluated using a Malvern Mastersizer 3000 Laser Diffraction System. The $d_{50}$ or $d_{98}$ value, measured using a Malvern Mastersizer 3000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005.

The processes and instruments are known to the skilled person and are commonly used to determine grain size of fillers and pigments.

The white UV-absorbing surface-reacted calcium carbonate doped with a titanium species obtained by the process of the present invention may have an intra-particle intruded specific pore volume in the range from 0.1 to 2.3 $cm^3/g$, preferably from 0.2 to 2.0 $cm^3/g$, more preferably from 0.4 to 1.8 $cm^3/g$ and most preferably from 0.6 to 1.6 $cm^3/g$, calculated from mercury porosimetry measurement.

The intra-particle pore size of the white UV-absorbing surface-reacted calcium carbonate doped with a titanium species preferably is in a range of from 0.004 to 1.6 μm, more preferably in a range of between 0.005 to 1.3 μm, especially preferably from 0.006 to 1.15 μm and most preferably of 0.007 to 1.0 μm, e.g. 0.1 to 0.6 μm determined by mercury porosimetry measurement.

The specific pore volume is measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 μm (~ nm). The equilibration time used at each pressure step is 20 seconds. The sample material is sealed in a 5 $cm^3$ chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p 1753-1764).

The total pore volume seen in the cumulative intrusion data can be separated into two regions with the intrusion data from 214 μm down to about 1-4 μm showing the coarse packing of the sample between any agglomerate structures contributing strongly. Below these diameters lies the fine interparticle packing of the particles themselves. If they also have intraparticle pores, then this region appears bi-modal, and by taking the specific pore volume intruded by mercury into pores finer than the modal turning point, i.e. finer than the bi-modal point of inflection, the specific intraparticle pore volume is defined. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

According to one embodiment of the present invention the white UV-absorbing surface-reacted calcium carbonate doped with a titanium species obtained by the process of the present invention has (i) a specific surface area of from $5 \ m^2/g$ to $200 \ m^2/g$, preferably from $10 \ m^2/g$ to $180 \ m^2/g$, more preferably from $20 \ m^2/g$ to $170 \ m^2/g$, even more preferably from $25 \ m^2/g$ to $150 \ m^2/g$, and most preferably from $30 \ m^2/g$ to $100 \ m^2/g$, measured using nitrogen and the BET method according to ISO 9277:2010 and/or (ii) a volume determined median particle size $d_{50}$ (vol) from 0.5 to 75 μm, preferably from 1 to 50 μm, more preferably from 2 to 40 μm, even more preferably from 2.5 to 30 μm, and most preferably from 3 to 15 μm, and/or (iii) a volume determined top cut particle size $d_{98}$ (vol) from 1 to 150 μm, preferably from 2 to 100 μm, more preferably from 4 to 80 μm, even more preferably from 5 to 60 μm, and most preferably from 6 to 30 μm and/or (iv) an intra-particle intruded specific pore volume in the range from 0.1 to 2.3 cm³/g, preferably from 0.2 to 2.0 cm³/g, more preferably from 0.4 to 1.8 cm³/g, and most preferably from 0.6 to 1.6 cm³/g, calculated from mercury porosimetry measurement.

According to one embodiment of the present invention the white UV-absorbing surface-reacted calcium carbonate doped with a titanium species obtained by the process of the present invention has (i) a specific surface area of from 5 m²/g to 200 m²/g, preferably from 10 m²/g to 180 m²/g, more preferably from 20 m²/g to 170 m²/g, even more preferably from 25 m²/g to 150 m²/g, and most preferably from 30 m²/g to 100 m²/g, measured using nitrogen and the BET method according to ISO 9277:2010 and/or (ii) a volume determined median particle size $d_{50}$ (vol) from 2.5 to 30 μm.

According to one embodiment the white UV-absorbing surface-reacted calcium carbonate doped with a titanium species obtained by the process of the present invention has a volume determined median particle size $d_{50}$ (vol) from 2.5 to 30 μm and the weight ratio of calcite to hydroxyapatite is from 70:30 to 30:70 based on the dry weight of the calcite and the dry weight of the hydroxyapatite.

The white UV-absorbing surface-reacted calcium carbonate that is doped with a titanium species obtainable by a process of the present invention can be provided in form of a suspension of white UV-absorbing surface-reacted calcium carbonate doped with a titanium species, as a separated white UV-absorbing surface-reacted calcium carbonate doped with a titanium species or as a dried white UV-absorbing surface-reacted calcium carbonate doped with a titanium species. According to a preferred embodiment the white UV-absorbing surface-reacted calcium carbonate doped with a titanium species obtainable by a process of the present invention is a dried white UV-absorbing surface-reacted calcium carbonate doped with a titanium species.

In case the white UV-absorbing surface-reacted calcium carbonate doped with a titanium species obtained by the process of the present invention has been dried, the moisture content of the dried white UV-absorbing surface-reacted calcium carbonate doped with a titanium species is less than or equal to 1.0 wt.-%, based on the total weight of the dried white UV-absorbing surface-reacted calcium carbonate doped with a titanium species, preferably less than or equal to 0.5 wt.-%, and more preferably less than or equal to 0.2 wt.-%. According to another embodiment, the moisture content of the dried white UV-absorbing surface-reacted calcium carbonate doped with a titanium species is between 0.01 and 0.15 wt.-%, preferably between 0.02 and 0.10 wt.-%, and more preferably between 0.03 and 0.07 wt.-%, based on the total weight of the dried white UV-absorbing surface-reacted calcium carbonate doped with a titanium species.

The inventive white UV-absorbing surface-reacted calcium carbonate doped with a titanium species may also be provided and/or used in form of a composition. According to one aspect of the present invention, a composition is provided comprising a white UV-absorbing surface-reacted calcium carbonate doped with a titanium species according to present invention. Said composition may further other filler materials such as natural ground calcium carbonate, precipitated calcium carbonate, and mixtures thereof may be present. The composition may comprise the white UV-absorbing surface-reacted calcium carbonate doped with a titanium species obtained according to process of the present invention in an amount of at least 20 wt.-%, based on the total weight of the composition, preferably at least 40 wt.-%, more preferably at least 60 wt.-%, and most preferably at least 80 wt.-%.

The inventors surprisingly found that by the inventive process a surface-reacted calcium carbonate is formed which provides additional functionalities due to the doping of the surface-reacted calcium carbonate with a titanium comprising species.

For example, the inventors of the present invention found that the surface-reacted calcium carbonate doped with a titanium species absorbs at least some of the UV radiation in the range from 280 to 400 nm. Therefore, the inventive surface-reacted calcium carbonate obtained by the process of the present invention can be used for sun protection of plants and parts thereof or for chemical and physical sun protection in a cosmetic formulation.

Furthermore, the inventors of the present invention found that the surface-reacted calcium carbonate doped with a titanium species is white and, therefore, may be used in suspensions, dispersions or slurries of minerals, fillers or pigments, which are typically employed in polymer applications, paper coating applications, paper making, paints, coatings, sealants, adhesives, feed, pharmaceuticals, concrete, cement, cosmetics, water treatment, engineered wood applications, plasterboard applications, packaging applications, catalysis, gas treatment applications and/or agricultural applications and provides a white appearance without adding further pigments.

Furthermore, the inventors surprisingly found the titanium species cannot be separated from the surface-reacted calcium carbonate by mere washing or in liquid compositions due to the doping.

Additionally, the inventors surprisingly found that white UV-absorbing surface-reacted calcium carbonate doped with a titanium species has a high surface area which is a fundamental prerequisite for several applications.

Since the white UV-absorbing surface-reacted calcium carbonate is doped with a titanium species it need not be labelled in the ingredient list with titanium dioxide particles in the submicron and/or nanometer size range and, therefore, should have a higher acceptance from the end consumer.

Use of the White UV-Absorbing Surface-Reacted Calcium Carbonate Doped with a Titanium Species The white UV-absorbing surface-reacted calcium carbonate doped with a titanium species may be used for various applications.

According to one embodiment, the white UV-absorbing surface-reacted calcium carbonate doped with a titanium species obtained by the process of the present invention or a composition comprising the same is used in polymer applications, paper coating applications, paper making, paints, coatings, sealants, adhesives, feed, pharmaceuticals, concrete, cement, cosmetics, water treatment, engineered wood applications, plasterboard applications, packaging applications, catalysis, gas treatment applications and/or agricultural applications. Engineered wood applications may comprise the use in engineered wood products such as wood composites materials, preferably medium density fibreboards or chipboards.

According to another embodiment of the present invention the white UV-absorbing surface-reacted calcium carbonate doped with a titanium species obtained by the process of the present invention or a composition comprising the same is used for sun protection of plants and parts thereof or for chemical and physical sun protection in a cosmetic formulation.

The inventors surprisingly found out that such a white UV-absorbing surface-reacted calcium carbonate doped with a titanium species obtained by a process of the present invention or a composition comprising the same provides sufficient sun protection to living cells and especially to human skin.

According to one embodiment of the present invention, the cosmetic formulation is a sunscreen product, facial makeup product, hair care product, hand care product, skin care product, body care product and mixtures thereof.

The inventive white UV-absorbing surface-reacted calcium carbonate doped with a titanium species obtained by a process of the present invention or a composition comprising the same may be incorporated into an article in order to provide an article with enhanced white colour and/or enhanced UV-absorbing properties. According to a further aspect of the present invention, an article is provided comprising a surface-reacted calcium carbonate obtainable by a process according to the present invention or a composition comprising the same, wherein the article is selected from paper products, engineered wood products, plasterboard products, polymer products, hygiene products, medical products, healthcare products, filter products, woven materials, nonwoven materials, geotextile products, agriculture products, horticulture products, clothing, footwear products, baggage products, household products, industrial products, packaging products, building products, and construction products.

The scope and interest of the invention will be better understood based on the following examples which are intended to illustrate certain embodiments of the present invention and are non-limitative.

EXAMPLES SECTION

1. Measurement Methods

In the following, measurement methods implemented in the examples are described.

1.1 Particle Size Distribution

Volume determined median particle size $d_{50}$ (vol) and the volume determined top cut particle size $d_{98}$ (vol) was evaluated using a Malvern Mastersizer 3000 Laser Diffraction System (Malvern Instruments Plc., Great Britain). The $d_{50}$ (vol) or $d_{98}$ (vol) value indicates a diameter value such that 50% or 98% by volume, respectively, of the particles have a diameter of less than this value. The raw data obtained by the measurement was analyzed using the Mie theory, with a particle refractive index of 1.57 and an absorption index of 0.005. The methods and instruments are known to the skilled person and are commonly used to determine particle size distributions of fillers and pigments. The sample was measured in dry condition without any prior treatment.

The weight determined median particle size $d_{50}$ (wt) and the weight determined top cut particle size $d_{98}$ (wt) was measured by the sedimentation method, which is an analysis of sedimentation behaviour in a gravimetric field. The measurement was made with a Sedigraph™ 5120 of Micromeritics Instrument Corporation, USA. The method and the instrument are known to the skilled person and are commonly used to determine particle size distributions of fillers and pigments. The measurement was carried out in an aqueous solution of 0.1 wt.-% $Na_4P_2O_7$. The samples were dispersed using a high-speed stirrer and were sonicated.

The processes and instruments are known to the skilled person and are commonly used to determine grain size of fillers and pigments.

1.2. Specific Surface Area (SSA)

The specific surface area was measured via the BET method according to ISO 9277:2010 using nitrogen and a ASAP 2460 instrument (Micromeritics GmbH, Germany), following conditioning of the sample by heating at 100° C. for a period of 30 minutes. Prior to such measurements, the sample was filtered within a Büchner funnel, rinsed with deionised water and dried at 110° C. in an oven for at least 12 hours.

1.3 X-Ray Diffraction (XRD)

XRD experiments are performed on the samples using rotatable PMMA holder rings. Samples are analyzed with a Bruker D8 Advance powder diffractometer obeying Bragg's law. This diffractometer comprises a 2.2 KW X-ray tube, a sample holder, a θ-θ-goniometer, and a VANTEC-1 detector. Nickel-filtered Cu-Kα radiation is employed in all experiments. The profiles are chart recorded automatically using a scan speed of 0.7° per min in 2 θ (XRD GV_7600). The resulting powder diffraction patterns are classified by mineral content using the DIFFRACsuite software packages EVA and SEARCH, based on reference patterns of the ICDD PDF-2 database (XRD LTM_7603).

Quantitative analysis of diffraction data refers to the determination of amounts of different phases in a multiphase sample and has been performed using the DIFFRACsuite software package TOPAS. In detail, quantitative analysis allows to determine structural characteristics and phase proportions with quantifiable numerical precision from the experimental data itself. This involves modelling the full diffraction pattern using the Rietveld approach such that the calculated pattern(s) duplicates the experimental one.

1.4 Reflectance Measurements

Reflectance analysis was carried out with a double beam PerkinElmer Lambda 950 UV/Vis/NIR spectrophotometer equipped with a 150 mm integrating sphere with PMT and InGaAs detectors.

The prepared dry compositions were measured by reflectance spectroscopy. The analysis was performed with the dry composition loaded into a sealed aluminum cup for powder samples, which was placed flush with the reflectance port of the integrating sphere. The spectrophotometer was scanned in the range 280 nm-800 nm in steps of 2 nm. A Spectralon white standard was used as 100% baseline. To get a proxy for the absorption spectrum of the dry composition, the measured reflectance spectrum was converted using the Kubelka-Munk equation $K-M=K/S=(1-R)^2/2R$, where R is the reflectance and K and S are the absorption and scattering coefficient, respectively.

1.5 (XRF) Measurements 11.5 g dry sample was pressed to a tablet, using a press at 400 KN. The elemental composition of the sample was measured by sequential, wavelength dispersive X-ray fluorescence (using an ARL™ PERFORM'X X-ray fluorescence spectrometer, Thermo Fisher Scientific, Inc., USA). The quantification was made by means of an external calibration which was especially prepared for calcium carbonate.

1.6. Specific Grinding Energy (SGE)

The specific grinding energy (SGE) was determined through first recording simultaneously the electrical power consumption (P) of the grinding device, given in kW, and the volumetric flow rate (Vs) of the feeding slurry, given in m³/h, and as indicated in the respective monitoring displays. Further, the total solids (TS) content of the feeding slurry, given in wt.-% was determined using a Moisture Analyzer HR73 from Mettler-Toledo (T=120° C., automatic switch off 3, standard drying) with a sample size of 5 to 20 g. Assuming the density of water ($\rho_w$) to be 1.00 T/m$^3$ and the density of the applied dry calcium carbonate/marble/chalk ($\rho_c$) to be 2.71 T/m$^3$, the SGE can be calculated as the function of the given quantities, as expressed in equations (1), (2) and (3).

$$SGE = P\,I\,((TS) \cdot m_s) \qquad \text{Eq. (1)}$$

$$m_s = \rho_s \cdot v_s \qquad \text{Eq. (2)}$$

$$\rho_s = [\rho_c \cdot \rho_w]/[\rho_c \cdot (1 - (TS)) + \rho_w \cdot (TS)] \qquad \text{Eq. (3)}$$

2. Material and Equipment

Calcium Carbonate-Comprising Material:

GCCI: Ground marble calcium carbonate from Carrera, Italy. The ground calcium carbonate had a medium weight based particle size distribution of $d_{50}$ of 7.9 μm, as determined by sedimentation.

$H_3O^+$ Ion Donor:

Phosphoric acid (HsPO$_4$) available from VWR Chemicals, (ortho phosphoric acid≥85%), Titanium Comprising Substance:

Titanium oxysulfate/TiOSO$_4$×H$_2$O available from Sigma-Aldrich under the number 14023

3. Sample Preparation 8 liters of an aqueous slurry of GCCI have been prepared in a mixing vessel by adjusting the solids content to an amount of 14 wt %, based on the total weight of the aqueous slurry.

Separately, a titanium oxysulphate solution was prepared via the addition of 205.2 grams of TiOSO$_4$×H$_2$O salt to 2052.3 g deionized water. After mixing for about 5 minutes, this solution was then added to 1228.5 g of 30 wt. % phosphoric acid and mixed for about 5 to 10 minutes. Whilst mixing the obtained reaction mixture at room temperature, it was added to the above calcium carbonate slurry over the period of 10 minutes. The GCCI and the dicalcium phosphate, obtained from the phosphoric acid and the GCCI, in combination have a calcium ion to phosphate ion molar ratio (Ca$^{2+}$:PO$_4^{3-}$) of 3.26:1.

The resulting slurry was then removed and aged overnight, after which it was then ground for a period of time using a horizontal bead mill (Dynomill Multilab WAB Bachofen) with a zirconium-yttrium grinding media (Silibeads ZY-S, 0.4-0.6 mm). The product was passed twice through the grinding chamber such that the desired PSD was attained. Sample 1 was then dried at 120° C. and sent for XRD which confirmed the conversion to hydroxyapatite.

| Sample | XRD (%) | | XRF (%) | | SSA |
|---|---|---|---|---|---|
| name | calcite | hydroxyapatite | S | Ti | (m$^2$/g) |
| Sample 1 | 52 | 38 | 5.79 | 4.66 | 89.9 |

The invention claimed is:

1. A process for producing a white UV-absorbing surface-reacted calcium carbonate doped with a titanium species comprising the steps of:

a) providing a calcium carbonate-comprising material, b) providing a calcium phosphate selected from monocalcium phosphate and/or dicalcium phosphate, c) providing at least one titanium comprising substance, and d) treating the calcium carbonate-comprising material of step a) with the calcium phosphate of step b) in an aqueous medium to form an aqueous suspension and e) grinding the aqueous suspension of step d) at a pH value of at least 4.2 to form an aqueous suspension of a white UV-absorbing surface-reacted calcium carbonate doped with a titanium species, wherein the calcium carbonate-comprising material of step a) and the calcium phosphate of step b) in combination have a calcium ion to phosphate ion molar ratio (Ca$^{2+}$:PO$_4^{3-}$) in the range from 1.75:1 to 100:1, and wherein the at least one titanium comprising substance of step c) is added before and/or during and/or after step d) and/or before and/or during step e).

2. The process of claim 1, wherein the calcium carbonate-comprising material is a natural ground calcium carbonate and/or a precipitated calcium carbonate.

3. The process of claim 1, wherein the calcium carbonate comprising material is in form of particles having a weight median particle size $d_{50}$ (wt) from 0.05 to 500 μm and/or a weight top cut particle size dog (wt) from 0.15 to 1500 μm.

4. The process of claim 1, wherein the calcium carbonate-comprising material of step a) and the calcium phosphate of step b) in combination have a calcium ion to phosphate ion molar ratio (Ca$^{2+}$:PO$_4^{3-}$) in the range from 1.9:1 to 75:1.

5. The process of claim 1, wherein the calcium phosphate of step b) is dicalcium phosphate dihydrate and is provided in an amount from 1.7 to 230 wt.-%, based on the total weight of the calcium carbonate-comprising material of step a), or wherein the calcium phosphate of step b) is anhydrous dicalcium phosphate and is provided in an amount from 1.4 to 181 wt.-%, based on the total weight of the calcium carbonate-comprising material of step a), or wherein the calcium phosphate of step b) is anhydrous monocalcium phosphate and is provided in an amount from 1.2 to 94 wt.-%, based on the total weight of the calcium carbonate comprising material of step a), or wherein the calcium phosphate of step b) is monocalcium phosphate monohydrate and is provided in an amount from 1.3 to 100 wt.-%, based on the total weight of the calcium carbonate-comprising material of step a).

6. The process of claim 1, wherein the at least one titanium comprising substance is selected from the group consisting of a titanium salt, a titanium hydroxide, a titanium dioxide, and mixtures thereof.

7. The process of claim 1, wherein the at least one titanium comprising substance is provided in an amount from 0.1 to 20 wt.-% of titanium element, based on the total dry weight of the calcium carbonate-comprising material.

8. The process of claim 1, wherein the aqueous suspension formed in step d) has a solids content from 1 to 95 wt.-%, based on the total weight of the aqueous suspension, and/or wherein in step d) the calcium carbonate comprising material is treated with a solution comprising the calcium phosphate of step b) and the at least one titanium comprising substance of step c).

9. The process of claim 1, wherein step e) is carried out at a pH value from 4.5 to 14.

10. The process of claim 1, wherein step d) and/or step e) is carried out at a temperature from 10 to 100° C.

11. The process of claim 1, wherein the dicalcium phosphate is produced by the following steps:

i) providing a calcium ion source excluding dicalcium phosphate, ii) providing a phosphate ion source selected from the group consisting of phosphoric acid, a salt thereof, and a mixture thereof, and iii) contacting the calcium ion source of step i) and the phosphate ion source of step ii) in the presence of water to form dicalcium phosphate, wherein the calcium ion source of step i) and the phosphate ion source of step ii) in combination are provided in a calcium ion to phosphate ion molar ratio from 1:2 to 5:1.

12. The process of claim 1, wherein steps b) and d) are replaced by the following steps B) an D)):

B) providing a phosphate ion source selected from phosphoric acid, a salt thereof, or a mixture thereof, and D) treating the calcium carbonate-comprising material of step a) with the phosphate ion source of step B) in an aqueous medium to form an aqueous suspension comprising dicalcium phosphate, wherein the calcium carbonate-comprising material of step a) and the phosphate ion source of step B) in combination are provided in a calcium ion to phosphate ion molar ratio $(Ca^{2+}:PO_4^{3-})$ in the range from 1.75:1 to 100:1.

13. The process of claim 1, wherein the phosphate ion source is phosphoric acid, a hydrogen-free salt of phosphoric acid, a monohydrogen salt of phosphoric acid, or a dihydrogen salt of phosphoric acid, or a mixture thereof.

14. The process of claim 1, wherein the process further comprises a step f) of separating the white UV-absorbing surface-reacted calcium carbonate doped with a titanium species from the aqueous suspension obtained in step e) and/or wherein the process further comprises a step g) of drying the surface-reacted calcium carbonate doped with a titanium species after step e) or after step f), if present, at a temperature in the range from 60 to 600° C.

15. The process of claim 14, wherein step f) is done by solvent evaporation and/or pressure filtration and/or until the moisture content of the surface-reacted calcium carbonate doped with a titanium species is less than 1 wt.-%, based on the total weight of the dried surface-reacted calcium carbonate.

16. The process of claim 1, wherein the calcium carbonate-comprising material of step a) and the calcium phosphate of step b) in combination have a calcium ion to phosphate ion molar ratio $(Ca^{2+}:PO_4^{3-})$ in the range from 2.5:1 to 10:1.

17. The process of claim 1, wherein the at least one titanium comprising substance is selected from the group consisting of titanium bromide, titanium fluoride, titanium iodide, titanium chloride, titanyl sulfate, and mixtures thereof.

18. The process of claim 1, wherein the phosphate ion source is selected from the group consisting of phosphoric acid, $NaH_2PO_4$, $KH_2PO_4$, $LiH_2PO_4$, $NH_4H_2PO_4$, $Ca(H_2PO_4)_2$, $Mg(H_2PO_4)_2$, and mixtures thereof.

* * * * *